US012109542B2

(12) United States Patent
English

(10) Patent No.: US 12,109,542 B2
(45) Date of Patent: Oct. 8, 2024

(54) METHOD AND GENERATOR OF PRODUCING SOLVATED NANOCLUSTERS

(71) Applicant: Niall Joseph English, Cambridge (GB)

(72) Inventor: Niall Joseph English, Cambridge (GB)

( * ) Notice: Subject to any disclaimer, the term of this patent is extended or adjusted under 35 U.S.C. 154(b) by 0 days.

(21) Appl. No.: 18/287,526

(22) PCT Filed: Apr. 17, 2023

(86) PCT No.: PCT/EP2023/059933
§ 371 (c)(1),
(2) Date: Oct. 19, 2023

(87) PCT Pub. No.: WO2023/202990
PCT Pub. Date: Oct. 26, 2023

(65) Prior Publication Data
US 2024/0269625 A1 Aug. 15, 2024

(30) Foreign Application Priority Data
Apr. 18, 2022 (GB) .................................... 2205666
Feb. 20, 2023 (GB) .................................... 2302376

(51) Int. Cl.
*B01F 23/2375* (2022.01)
*B01F 25/452* (2022.01)
*B01F 33/05* (2022.01)

(52) U.S. Cl.
CPC ........ *B01F 23/2375* (2022.01); *B01F 25/452* (2022.01); *B01F 33/05* (2022.01)

(58) Field of Classification Search
CPC ....... B02C 17/14; B02C 17/186; B02C 17/24; B01F 31/201; B01F 31/25; B01F 31/70; B01F 31/40; B01F 31/60; B01F 2035/98; B01F 23/2375; B01F 25/452; B01F 33/05; B82Y 30/00; B82Y 40/00; C01B 32/182; C01B 32/19; C01B 32/225; C01B 2204/02; C01B 2204/04; C01B 2204/32; F16C 3/02; F16H 1/20; F16H 1/22; F16H 37/065; F16H 53/00; F16H 53/02; F16H 55/17; F16H 2055/176; C01P 2006/12; Y10T 74/19051; Y10T 74/1987; Y10T 74/19949; Y10T 74/2101; Y10T 428/2991
USPC .......................................................... 366/149
See application file for complete search history.

(56) References Cited

FOREIGN PATENT DOCUMENTS

| | | | | | |
|---|---|---|---|---|---|
| EP | 3665123 | A1 | | 6/2020 | |
| WO | WO-2014200790 | A1 | * | 12/2014 | C12Q 1/04 |
| WO | 2021073780 | A1 | | 4/2021 | |
| WO | WO-2022258960 | A1 | * | 12/2022 | A61P 35/00 |
| WO | WO-2023202990 | A1 | * | 10/2023 | B01F 23/2375 |

* cited by examiner

*Primary Examiner* — Charles Cooley

(57) ABSTRACT

A system (300), method and generator (301) for producing solvated nanoclusters of a guest substance. The method comprises providing a container (302) containing a plurality of surfaces (304) distributed therein; introducing a solvent (103) within which the solvated nanoclusters are to be generated into the container such that the solvent comes in contact with the surfaces; and distributing a fluid guest substance within the solvent, wherein the plurality of surfaces comprises random packings or structured packings or both, wherein the packings are made of or coated with (i) permanent-magnetic material or (ii) dielectric material that has a quasi-permanent electric charge or dipole polarisation.

25 Claims, 10 Drawing Sheets

METHOD AND GENERATOR OF PRODUCING SOLVATED NANOCLUSTERS

The present invention relates to the generation of nanoclusters, in particular to a system, method and generator for generating solvated nanoscale features in a liquid, wherein the nanoscale features contain guest moieties structured by solvent molecules, are gas, liquid, amorphous or crystallite in form and are present in amounts beyond thermodynamic solubility of the guest.

BACKGROUND TO THE INVENTION

In liquids, the solubility of fluid guest molecules therein is limited thermodynamically by chemical-potential and fugacity equilibrium. This applies equally whether the guest is a gas or liquid in its fluid state at the corresponding pressure and temperature. For instance, if the guest is a pure gas or multicomponent-gas mixture, the thermodynamic solubility of that particular guest is often expressed as Henry's Law within the liquid phase, i.e., the amount of dissolved gas in a liquid is directly proportional to its partial pressure above the liquid. In the case of the bulk fluid guest being in liquid form, either as a pure component or as part of a liquid mixture, the activity-coefficient approach is often used to describe this "guest-in-liquid" chemical-potential formalism.

It is possible to increase the effective content of guest molecules in a strictly metastable (but often very long-lived) sense beyond, and sometimes far beyond, traditional thermodynamic dissolution by using solvated nanoclusters of such guest molecules in liquid.

By solvated nanocluster is meant a nanoscale assembly of guest molecules within a mother liquid, wherein the guest molecules are intermingled amidst molecules of this liquid, i.e., solvent and guest molecules may be arranged next to each other or else the guest molecules are structured in some way by the solvent. Prior to the formation of nanoclusters, the guest in its own bulk phase may be a gas, liquid or supercritical fluid. As opposed to spherical nanobubbles or nanodroplets, nanoclusters may be irregular in shape. Typical dimensions are from about to 2 nm to about 100 nm in at least one dimension.

Nanoclusters may take various forms, e.g., hydrated or solvated nanoscale crystallites containing both guest and solvent molecules, or domains of nanoscale dimension of gaseous and/or liquid character containing the guest in varying proportions from the guest-supplying bulk fluid phase (either single- or multi-component)—which feature also nanostructured solvation layers enveloping and interpenetrating the nanoscale fluid-phase domain.

Heretofore, a range of methods are known for preparing additional guest accommodation in liquids at the nanoscale, beyond the thermodynamic solubility level of the guest. However, such methods usually introduce electrolysis or foreign substances (e.g., ions) into the liquid, leading to contamination problems, as well as energy inefficiency. WO 2014/148397 applies water electrolysis, yielding water splitting to hydrogen and oxygen where the produced gases form gas that dissolves in the water at the nanoscale, beyond their thermodynamic dissolution levels, i.e., where individual molecules are hydrated by their aqueous surroundings. However, technologies using water electrolysis require direct liquid-electrical contact of water and an electrode or electrical discharge.

Known methods using hydrodynamic cavitation tend to be less efficient at generating meaningful levels of gas at the nanoscale, and reduced guest-solubility boosting. WO 2017/156410 discloses a method and apparatus for generating gas at the nanoscale in a solvent, wherein a gas put into the apparatus at a pressure such that it is forced through a porous sidewall to form nanoscale gas on the outer surface of the gas-permeable membrane. This technology is based around hydrodynamic cavitation, which is essentially a process of vaporisation, with bubble generation and implosion, which takes place in a flowing liquid as a result of a decrease and subsequent increase in localised pressure.

Prior art efforts to generate solvated nanoclusters going beyond thermodynamic solubility involving mechanical methods have been found to be very costly in terms of energy requirements and physical apparatus required. For example, EP 2986975 outlines methods and systems for controlling nanofluid-domain and nanoparticle dynamics in conical nanopores. This involves a high level of mechanical energy and can experience problems with pore blockages in practice.

Moreover, many known methods require the addition of additives which contaminate the liquid, whilst also leading to guest solubilities being relatively low—not the desired effect, given that the goal is to enhance the content of the guest moieties as much as possible.

There is therefore a need for a method, system and apparatus for generating solvated nanoclusters—be it crystallites or fluids at the nanoscale—which addresses the drawbacks of the prior art such as reduced energy efficiency or at least provides a suitable alternative.

SUMMARY OF THE INVENTION

The present invention relates to an energy efficient system, generator and method for boosting guest accommodation in liquids at the nanoscale beyond the thermodynamic solubility of the guest.

The invention is as defined in the claims.

In one aspect, the invention is directed to a method of producing solvated nanoclusters, the method comprising the following steps:

- providing a volume containing a plurality of surfaces distributed therein;
- introducing a solvent within which the solvated nanoclusters are to be generated into the volume such that the solvent comes in contact with the surfaces; and
- distributing a fluid guest medium within the solvent, wherein the surfaces possess one or more of magnetic, charged, dielectric, polarised, dipolar, solvophobic and solvophilic character such that they emit one or more spatial force distributions to create local density undulations and oscillations in the solvent.

The volume may be a vessel and the terms volume, vessel and container are used interchangeably herein.

The nanoclusters produced by the method according to the invention are nanoscale features in the solvent and are gas, liquid, amorphous or crystallite in form. These nanoscale features contain guest molecules intermingled amidst molecules of the solvent, i.e., solvent and guest molecules may be arranged next to each other or else the guest molecules are structured in some way by the solvent.

The method according to the invention involves electrostrictive capture of the guest in the solvent by inducing density shifts in the solvent/guest mixture, such density shifts arising from internal spatial force-field distributions of varying character(s) which emanate from the surfaces. In other words, externally generated fields are not required. However, this is not considered to be limiting and the placing of electric or magnetic fields, or both, external to the volume may be used in combination with the internal spatial force-field distributions.

Importantly, the plurality of surfaces are not in direct electrical contact with the solvent-guest medium mixture. This avoids forming a circuit and prevents energetically inefficient electrolysis, should there be any underlying electrical conduction.

The method may comprise the following steps:

providing a container with a plurality of surfaces distributed therein;

introducing a solvent within which the solvated nanoclusters are to be generated into the container such that the solvent comes in contact with the plurality of surfaces;

providing one or more guest substances in fluid form; and distributing the guest substance, or each of the guest substances, within the solvent, wherein the plurality of surfaces comprises random packings or structured packings or both, wherein the packings are made of or coated with either (i) permanent-magnetic material to provide a magnetic character of about 0.1 T to about 0.5 T, or (ii) dielectric or charged/polarised material that has a quasi-permanent electric charge or dipole polarisation with typical strengths of internal Coulombic fields ranging from about $10^5$ V/m to about $10^7$ V/m, such that the plurality of surfaces emit one or more spatial force distributions to cause forces with a strength in the pico Newton to nano Newton range, preferably from about 5 pN to 10 nN, on atoms in the solvent and guest molecules to induce local density undulations, oscillations and fluctuations in the solvent.

In a preferred embodiment, the packings are treated so as to have solvophobic or solvophilic character or regions with solvophilic character and other regions with solvophobic character, i.e., alternating solvophobic and solvophilic character. In these embodiments, surface-wetting contact angles are preferably between circa 130 to 165° and surface coverage is preferably in the range of from 15-20% with 1.5-4 mm characteristic dimensions particularly preferred, in tandem with "solvophobic-spot" thicknesses of from about 0.6 mm to about 1 mm.

Vanishingly small energy levels are required to generate the nanoclusters using the method according to the invention. Further advantages include the fact that electrical safety is improved compared to known set-ups.

The method of the present invention, is energy efficient and leads to guest accommodation in the solvent beyond conventional thermodynamic dissolution.

The solvent may also be referred to herein as the mother liquid.

The method according to the invention optimises the level of guest capture from the fluid guest medium in nanoscale form in the solvent by direct action of the spatial force distributions on the solvent-guest medium mixture.

The presence of nanoclusters generated by the method according to the invention in a solvent confers beneficial properties to the solvent, e.g., antibacterial or chemical-reactivity properties. Furthermore, the solvated nanoclusters may adsorb other solvated molecules, impurities and agents from the solvent.

Without being bound by theory, the main reason why more chaotic, frustrated and irregular nanoclusters—as opposed to spherical nanobubbles or nanodroplets—are generated by the method according to the invention is that the speed of molecular rearrangement is enhanced by the spatial force distributions emitted from the surfaces, in particular by the combination of spatial force distributions emitted from the surfaces. The spatial force distributions act on the atoms of the solvent to create local density undulations and oscillations in the solvent. Specifically, the nature of the packings described herein gives rise to efficient macro- to meso-scale solvent-guest mixing, by eddy currents and the like, and, in turn, this momentum transfer "cascades" down to the microscale. The packings act as efficient "microscale-mixing" platforms to assist in promoting the speed of molecular rearrangement and in enhancing density oscillations—in terms of speed and amplitude—in the proximity of the surfaces of the packings. The surfaces thus facilitate the rapid uptake of fluid-state guest species from the medium in nanoscale form, i.e., in supersaturated nanoclusters beyond conventional liquid-state guest dissolution.

In embodiments wherein the surfaces possess magnetic character, i.e., wherein the packings are made of or coated with permanent-magnetic material, the magnetic character produces a stationary spatial magnetic force distribution in the solvent. In terms of mechanistic effects to generate nanoclusters, the magnetic character of the stationary spatial magnetic force distribution is considered to be important, in that the spatial force distributions acting on the solvent and guest, via Lorentz forces, serve to weaken the forces between molecules, i.e., intermolecular forces between solvent molecules in the mother liquid. In practice, this facilitates substantially more rapid rearrangements of the near-molecular-environment coordination shell, which permits rapid rearrangements of hydrogen bonding, electrostatic contacts and coordination numbers in the solvent, promoting faster diffusion of solvent and guest molecules into entropy-reducing nanocluster form even if the magnetically-liberated solvent/guest rearrangements happen more quickly so as to be frustrated solvent/guest configurations into the lowest free-energy form.

In addition, the distributed fluid guest phase itself is, by its very nature, more compressible than that of the surrounding mother liquid. Although the magnetic field serves to weaken intermolecular interactions, the substantially greater compressibility of the fluid guest phase per se actually induces a densification response here in response to the Lorentz forces—the exact opposite to that of solvent (a slight reduction in density—which, in combination with a Coulombic field increasing density in the liquid via electrostriction conspires to set up greater-amplitude density waves in the present work on a "dual-effect" basis of static magnetic and electric—"working hand in glove"). In any event, the densification of the much more compressible fluid phase by the magnetic field, opposite to that of the solvent, leads to strong density undulations and fluctuations—which draws the fluid phase into the mother solvent on the fast, chaotic basis necessary to generate nanoclusters efficiently.

In the embodiment wherein the surfaces possess charged, dipolar, dielectric or polarised character, i.e., wherein the packings are made of or coated with dielectric or charged/polarised material that has a quasi-permanent electric charge or dipole polarisation, a steady-state and time-constant spatial force distribution is provided throughout the body of the mother liquid, primarily wherein the spatial force distribution is Coulombic in nature, that is an intrinsic electrostatic or electric field emanates from the surfaces. In terms of how this Coulombic force facilitates nanocluster generation, it is believed the dipolar and quadrupole interactions in the solvent and the fluid guest medium (including macro-, meso-, or micro-scale bubbles or droplets) with the Coulombic forces allow for electrostriction to take place, i.e., densification of the liquid, and the resulting temporary negative-pressure region is dissipated quickly by associated sucking in of the distributed guest fluid phase in a local density ripple, i.e., re-establishment of mechanical equilibrium in the volume of the solvent with the sudden and chaotic creation of nanoclusters. With convective and/or passive flow of the solvent, especially enhanced by interphase guest-solvent mass-transfer packings distributed in the body of the container, this gives rise to the constant establishment and re-establishment of local density fluctuations by the passing liquid and fluid mixed therewith (in a constant guest-solvent "churn"), in regions of the solvent affected by the Coulombic forces—which is facilitated further by magnetic forces, if present at the surfaces, realising larger amplitude of density fluctuations and more facile creation of nanoclusters.

In embodiments wherein the surfaces possess solvophobic, solvophilic, or alternating solvophobic and solvophilic character, forces attracting the guest to the solvent are provided for the solvophilic case, whilst forces repelling the guest from the solvent arise in the solvophobic case. In the alternating-character cases, particular regions both repel and attract guest molecules, allowing for particular structuring of guest molecules into particular solvation environments.

By alternating solvophobic and solvophilic character is meant that the surfaces are provided with a patchwork arrangement of solvophilic and solvophobic regions. The arrangement may be uniform or quasi-random in distribution and may comprise a spotted pattern. However, alternating character is not considered limiting and the surfaces may alternatively be all-solvophobic or all-solvophilic, depending on the guest fluid medium.

One example of how alternating patchwork surfaces may induce guest-solvent ordering to result in the formation of nanoclusters is in the case of nanoclusters composed of clathrate-hydrates generated in water. For instance, a solvophobic guest such as methane may be attracted selectively from the guest fluid phase to solvophobic points on the surfaces. In turn, the structuring of the water immediately around the guest molecule allows the facile formation of hydrate cages.

All-solvophobic or all-solvophilic surfaces are preferably used to make fluid-phase nanoclusters with a greater portion, i.e., mole fraction, of a solvophobic or solvophilic fluid-phase guest attracted thereto, albeit with solvent intermingling and structuring effects in the guise of nanoclusters.

In some embodiments, the surfaces are all of the same character. Alternatively, the plurality of surfaces may comprise different surface types, i.e., surfaces possessing one of magnetic, charged, dielectric, polarised, dipolar, solvophobic and solvophilic character, and surfaces possessing another of magnetic, charged, dielectric, polarised, dipolar, solvophobic and solvophilic character, e.g., surfaces possessing magnetic character and surfaces possessing dielectric character.

Alternatively, or additionally, the surfaces may each independently possess a combination of any two or more of magnetic, charged, dielectric, polarised, dipolar and alternating solvophobic and solvophilic character and these characters may be combined in different quantities and ways.

In a preferred embodiment, the plurality of surfaces possess a combination of magnetic and charged or polarised character. This leads to mixed convective flow past any point in the solvent courtesy of packing-induced turbulence and meso/micro-scale mixing. The opposing-effect of magnetic fields on the guest and solvent density cause the solvent and guest to "crash" into each other all the more violently in a density-churn—more "rigid" fluid-guest and less rigid solvent—causing the traumatic birth of nanoclusters, given the background electrostriction of the static Columbic or electrostatic field borne of packing-surface polarisation, charge, dielectric, solvo-phobic/philic character.

The combination of magnetic and charged or polarised character results in enhanced overall levels of molecular rearrangement in the solvent and capture of guest species into the solvent. These rearrangements in the solvent create relatively large-amplitude density undulations and fluctuations—particularly when enhanced by guest-solvent mixing imparted by hydrodynamically efficient mass-transfer packings. When coupled with the outcome of greater overall guest capture into the solvent and larger density undulations, this creates ideal milieux by which to boost nanocluster generation. The magnetic-field intensities of the surfaces may range from 0.1 T to 2 T, although the region of 0.1 to 0.5 T within 2 cm from the surfaces is effective for nanocluster generation if the electrostatic-field intensity emanating is between 1 and 1,000 kV/m within 2 cm from the packings' surfaces. In this embodiment, if the packings are not magnetic themselves, i.e., not made of magnetic material such as ferritic stainless steel or neodymium, they are coated with magnetic material and the width of the deposited magnetic surface layer is preferably between about 0.2 mm and about 0.8 mm, whilst the surface-charge and/or polarisation density is, preferably in the range of from about 5 $mC/m^2$ to about 0.2 $C/m^2$ and between about 0.1 $(Cm)/m^2$ and about 200 $(Cm)/m^2$, respectively In a preferred embodiment, the plurality of surfaces possess a combination of magnetic, dielectric and alternating or sole solvophobic/solvophilic character.

The combination of magnetic, dielectric and alternating/sole solvo-phobic/philic character promotes density fluctuations in the solvent and at the solvent/guest interface, e.g., bulk or in the form of larger micro-/meso-scale features of guests such as, but not limited to, droplets and bubbles. The dielectric surface character promotes substantial polarisation response if an internal-to-device power source is used. This therefore provides an option to simultaneously boost the importance of spatial distributions of Coulombic character by an internal source—in other words, an intrinsic electrostatic or electric field emanating into the body of the volume. The typical field intensity is 1 and 1,000 kV/m within 2 cm of the surfaces, for a dielectric constant of 2 to 5 and a dielectric-screening thickness of 0.1 to 0.5 mm. In addition, by combining surface-distributed solvo-phobic/-philic features on the surfaces in domains sized in the 1-3 mm range with surface coverage of 10-15%, it is possible to manipulate species-selective capture from the fluid guest medium to either promote more solvo-phobic or -philic components being drawn into density fluctuations with the solvent, so as to make nanoclusters featuring more prominently solvophobic or -philic components. The intrinsic level of solvophobicity and -philicity is measured by surface-wetting phenomena to be, respectively, with contact angles in the region of 120-160° and 35 to 65°, and surface-deposition thicknesses of 0.2 to 0.5 mm. The combination with dielectric materials is important here, as this allows for more control of the Coulombic component to be applied—or not—in a time-dependent sequence, e.g., pulsed, etc. Effective pulse régimes consist of half-sine-wave DC at 50-200 MHz (e.g., with a half-wave rectifier, etc.).

In a preferred embodiment, the plurality of surfaces possess a combination of charged, polarised, and solvophilic character with surface-wetting contact angle of 35 to 65° and surface coverage of 10-15% in 1-3 mm size ranges. The surface-charge density is 5 $mC/m^2$ to 0.2 $C/m^2$ and the surface-polarisation density is 0.1 $(Cm)/m^2$ and 200 (Cm)/

$m^2$. This embodiment is preferred for the capture of solvophilic species and generation of nanoclusters based on solvophilic species as guest molecules. The inclusion of solvophilic nature is preferred, as the charged and polarised materials confer effective Coulombic action on guest-components especially of this qualitative physico-chemical nature, i.e., solvophilic character, thus reinforcing the density undulations and fluctuations necessary for nanocluster generation. The more facile surface wetting engendered by partial solvophilic surface coverage reinforces the density fluctuations in a non-uniform way across the packings' surfaces—drawing the passing solvent molecules easily to the surface in non-uniform "packets", which also serves to allow for more rapid nanoscopic solvent-guest mixing: in this way, the solvophilic interactions mimic the "quickening" effect on solvent dynamics of a magnetic field, and cooperate with the intrinsic electrostatic field of the surface to induce nanocluster formation.

In a preferred embodiment, the plurality of surfaces possess a combination of magnetic and solvophobic character.

This embodiment is preferred for the species-selective incorporation of solvophobic components into the solvent. Here, the presence of charged, polarised or dielectric character is less beneficial, although the magnetic character of the surface more readily promotes larger density fluctuations and undulations in the solvent and at any interface(s) of the solvent with guest molecules, together with the abovementioned process of parallel densification of the (meso-bubble/droplet-dispersed) guest-fluid phase and de-densification of the mother solvent. In this embodiment, without bulk- or surface-material features promoting an intrinsic Coulombic field, the magnetic-field intensity within 1 cm of the surfaces is preferably from about 0.5 T to about 2 T. In embodiments wherein a magnetic-material surface deposition approach has been used (as opposed to using a magnetic material like ferritic stainless steel for the bulk material), then the thickness is preferably in the range of from about 0.8 mm to about 1.5 mm. The solvophobic features, in turn, allow for qualitatively larger levels of interaction between solvophobic molecules, and the enhanced contact with the solvent in density fluctuations and molecular-level solvent rearrangements. Surface-wetting contact angles between circa 130 to 165° and surface coverage of 15-20% with 1.5-4 mm characteristic dimensions are preferred, in tandem with "solvophobic-spot" thicknesses of from about 0.6 mm to about 1 mm. Without being bound by theory, such surfaces form nanoclusters with a much higher degree of presence of solvophobic molecules, and this approach may be used with profit to extract preferentially solvophobic guest moieties from the dispersed fluid phase.

The surfaces are preferably located close together within the volume, e.g., packed tightly into the volume, e.g., with packing densities of from 350-5,500 $m^2/m^3$.

In some embodiments, the surfaces may be present in a fixed distribution or pattern.

In some embodiments, the surfaces comprise random packing to increase surface area for vapour/liquid contact so as to promote medium-liquid inter-phase mixing. This may promote the formation of both macro- (>0.1 mm) and meso-scale (0.01-0.1 mm) bubbles and droplets for the dispersed guest fluid phase—with momentum transfer of micron-scale guest-solvent mixing, e.g., scale of 1-10 microns.

Additionally, or alternatively, the surfaces may comprise structured packings such as rods or discs composed of materials like metal, plastic or porcelain, e.g., discs of honeycombed shapes or corrugated sheets of perforated embossed metal, plastic or wire gauze. In this embodiment, the characteristic undulating, periodic dimensions are preferably of the order of from about 0.5 mm to about 3 mm, to enhance further macro- to meso-scopic interphase (guest/solvent) mixing.

In a preferred embodiment the surfaces are in the form of wires or strips, wherein the surfaces are arranged in an alternating "sandwich-like" set of alternating strands with a given polarisation memory. This alternating alignment maximises the effect of induced density undulations in the solvent by alternation of polarisation in space, and, therefore, the electrostrictive capture of the minority fluid phase, i.e., the fluid guest substance, to induce efficient nanocluster formation. In this embodiment the strands are preferably separated by from about 0.1 mm to about 2 mm. The polarisation memory is preferably of the order of from about 20 $(Cm)/m^3$ to about 1,400 $(Cm)/m^3$. Alternatively, the wires or strips may be connected to an internal electric source such that polarisation is induced, e.g., mounted on printed circuit boards featuring alternating and interweaved polarisation elements spaced from about 10 to about 500 microns apart with a DC feed voltage, e.g., 50 to 100 MHz-pulsed DC feed voltage, of from about 6 V to about 48 V.

In another preferred embodiment, the surfaces are in the form of interlaced strands, wherein two or more strands of opposing polarity or character, e.g., polarised, charge, magnetic, dielectric, solvo-phobic/philic character, are entwined together to form a flat, solid structure like a plait. Here, optimal surface-charge densities are from about 10 $mC/m^2$ to about 0.3 $C/m^2$ and advantageous ranges for surface-polarisation density are from about 0.15 $(Cm)/m^2$ to about 150 $(Cm)/m^2$. The interlaced strand embodiment induces microscopic density undulations in the solvent to encourage the formation of nanoclusters. The separations between the strands are optimally from about 0.5 to about 3 mm. Advantageously, the magnetic field strength is from about 0.1 T to about 1.5 T within 1 cm of each strand, whilst the contact angles of the solvo-phobic/philic regions are preferably from about 120-160° and from 35 to 65°—featuring preferred surface-deposition thicknesses of from about 0.2 mm to about 0.5 mm and typical surface coverages of about 15-20%. In these embodiments, the strands may optionally be connected to a power source internal to the volume, such as a water wheel, battery, etc. with appropriate sheathing to induce opposing polarity in the multi-strand plaited arrangement.

In a particularly preferred embodiment, the strands may be assembled in a "criss-cross" type of mesh, rather like a tennis-racquet lattice, although not requiring such perfect geometric order. The typical spacing between strands is advantageously in the range of from about 2 mm to about 6 mm. The strands may be arranged parallel or perpendicular to a flow arrangement, or oriented at an angle—including to gravity-based or convective-based downward flow of guest fluid medium or buoyancy-based upward flow of guest fluid medium, wherein the guest may also be present as a population of macroscopic droplets or bubbles.

In another preferred embodiment, the strands, in which there is a polarisation or polarity, may also have one polarity or polarisation setting as a single electrode—which can be unsheathed if there is an internal-to-device current applied to avoid electrolysis in the solvent. In some embodiments, an electric conductor may have a current of a given polarity assigned to each of the alternating 'wires' or strips, in that differing polarities are alternated in "polarity" sandwich layers, e.g., using a layout on printed circuit boards. This gives essentially the same ultimate effect of enhancing the spatial variation of induced density shifts in the solvent—by rearranging the molecules in different alignments, and enhancing electrostrictive capture. In particular, induced rotational motion of solvent molecules' dipoles, quadrupoles and higher-order multipoles from surface polarisation enhances solvent densification from electrostriction, with the thus-induced substantial temporary negative-pressure region at the interface of the solvent and the (dispersed) fluid phase inducing nanocluster formation, given the lack of sufficient time for guest-molecule diffusive motion to escape the coordination shells of solvent molecules which would result in the formation of a more ordered nano-bubble or droplet).

In some embodiments wherein an internal electric source is used, such for example a paddle-wheel, battery, dynamo or the like, a control circuit allows the internal electric source to be switched on and off and the voltage to be varied, e.g., for a half sine-wave rectifier with a pulse frequency of 20 to 250 MHz, with a root-mean-square (r.m.s.) voltage of 6-48 V more preferred, but up to 310 V being possible. This voltage modulation may be in response to the level of nanoclusters generated and on any downstream effects of the nanoclusters on the application(s) for which their generation is used.

The plurality of surfaces preferably comprise one or more random packings selected from among, albeit not limited to, Raschig rings, Pall rings, Saddle rings, Teller Rosette rings, Lessing rings and Tri-Packs, particularly preferably wherein the surfaces comprise Raschig rings. By Raschig Rings are meant small pieces of tube usually about as long as they are wide, preferably smooth, without holes, grooves, ribbing or other textured elements. Pall rings include added internal support structures and external surfacing. The texture within the ring walls allows for points of internal dripping that significantly increase the capacity and the efficiency of the packing. Saddle rings, e.g., Berl saddles or Intalox® saddles, differ from Raschig and Pall rings in that their length exceeds their diameter. Lessing rings have internal partitions to increase surface area and enhance efficiency. Teller rings have a ring-shaped, 'doughnut' structure. Tri-Packs are of spherical shape with interior ribs.

As mentioned previously and without being bound by theory, the reason why random packings like those described above are effective for nanocluster generation lies in the efficiency of meso-scale inter-phase (solvent/guest) mixing—and momentum transfer into the micro- and nanoscopic length scales, which boosts the amplitude of spatial and temporal density fluctuations in the locale of surfaces of varying spatial-field character(s) emanating therefrom. This acceleration in time and increase in amplitude overcomes guest/solvent diffusive-motion phase 'segregation'- and leads to the intimate molecular-level missing between guest and solvent in nanoclusters.

In the case of Raschig rings, packing densities in the range of from 350-5,500 $m^2/m^3$ are preferred.

In some embodiments, the plurality of surfaces may be connected to a means for distributing a spatial distribution of Coulombic forces within the volume, e.g., each of the surfaces may be connected via a single- or double- (anode/cathode) polarity wire to an electric source, e.g., paddle-wheel, battery, dynamo, etc., within the volume. These internal electric sources preferably emit DC at typical voltages of 6 to 310 V, and more especially 12 to 48 V, on either a pure DC or (sine-wave) rectified basis at 20 to 250 MHz, and more especially 50 to 200 MHZ; this engenders the creation of spatial lines of Coulombic force, or electric/electrostatic fields, with intensity in the 2-1,500 kV/m band within 1-2 cm from the packings' surfaces, emanating from the body of the surfaces.

Connecting the plurality of surfaces to an internal to volume means for distributing a spatial distribution of Coulombic forces induces solvent electrostriction (and associated temporary vacuum at the solvent-guest interface) efficiently in close temporal sympathy with the meso- to micro-scale inter-phase guest-solvent mass transfer in the vicinity of the packings' surfaces. This is because the packing-induced micro-scale eddy currents (acting over 1-10 microns) have typical relaxation times of less than micro-seconds (typically 0.05 to 0.5 micro-seconds). In this way, micro-eddy-enhanced guest-solvent inter-phase mass transfer at the nano- to micro-scale (over circa 20 to 3,500 nm) overlaps at both temporal and spatial scales with the inherent length and time scales of the electrostatic-field variation—in a type of Coulombic-hydrodynamic "resonance" in both space and time. This benefits the chaotic "suction" action of electrostriction leading to solvent densification in cycles over time (time-varying DC voltage) and space (by virtue of micro-scale eddy currents borne of mass-transfer packings). In this way, guest ingress at the molecular scale into the mother solvent is "chaotic"—overcoming the thus-induced, temporary guest-solvent interfacial vacuum by "emergency" guest ingress into the liquid to re-establish local mechanical equilibrium (i.e., instantaneous equilibrium of pressure throughout all space, re-established at the nano- to micro-scale, over about 20 to 3,500 nm). The speed of guest ingress into the solvent is thus accelerated to be far faster than diffusional timescales over many tens of nanometres for tens to hundreds of thousands of guest molecules to "segregate" from "coordination shells" around the solvent (that would otherwise result in the more graceful birth of nanodroplets or bubbles). In this way, we realise herewith efficiently the exceptionally rapid, diffusion/rearrangement-defying and "traumatic" circumstances of nanoclusters' genesis. Of course, even in the absence of a time-varying DC voltage—i.e., with instead time-invariant DC and/or else an intrinsic-to-material Coulombic/electrostatic spatial field or distribution of forces—there would still be the micro-second and micro-metre inter-phase guest-solvent mass-transfer processes borne of use of mass-transfer packings (whether random or structured), with time-invariant Columbic-force fields/distributions inducing electrostrictive "vacuum-overcoming" guest capture into the mother solvent as the passing micro-eddy currents are newly and continuously encountered thereat (i.e., at each point in the electrostatic-field locale of these surfaces)—on a continual basis, giving rise to a resultant rate of nanocluster generation (as would be the case for a time-varying static, DC Coulombic-force distribution).

In the alternative preferred embodiment of structured packings, in the case of DC-electric source connections, there would be far fewer connections necessary vis-à-vis random packings. In the embodiment using double polarity, conducting surfaces are preferably covered to suppress electrolysis of the solvent. The wire comes from an internal electric source, i.e., an electric source located within the volume such as a paddle-wheel, battery, dynamo or the like.

In some embodiments, the surfaces comprise a series of concentric elements.

In some embodiments, the plurality of surfaces are arranged in a mesh configuration, preferably wherein the surfaces comprise mesh elements with typical dimension of heterogeneity spanning from about 0.2 mm to about 5 mm, particularly preferably wherein the plurality of surfaces are arranged in a parallel configuration.

In a preferred embodiment, the surfaces comprise mesh elements and each mesh element independently comprises an aperture, preferably with dimensions of from about 0.2 mm to about 3 mm, for receiving a portion of a means for delivery of the guest medium and solvent into the volume, preferably wherein the means for delivery comprises an elongated tubular member for insertion through the apertures of the mesh elements, optionally wherein the tubular member is operably mounted on a base member.

In one embodiment, the means for delivery comprises a plurality of apertures for facilitating the distribution of the medium within the volume, preferably wherein the apertures are dimensioned for accommodating the medium therethrough but preventing an ingress of the solvent from the volume, e.g., in the range of from about 0.5 mm to 1.5 mm in diameter.

In some embodiments, the plurality of surfaces are all of the same packing structure. Alternatively, the surfaces comprise different packing types, e.g., structured and random, or different shapes, e.g., Raschig rings and Intalox saddles, or both.

The surfaces may be made from carbon, ceramic, glass, metal such as stainless steel, or polymers such as plastic, or combinations thereof. Preferably, the surfaces comprise polymeric material, e.g., fluoropolymers such as polytetrafluroethylene.

The packings are preferably of the order of a few millimetres to several centimetres, particularly preferably wherein the packings are of the order of sizes of from about 15 mm to about 150 mm, especially from about 25 mm to about 75 mm.

The surfaces may be made of material which intrinsically possesses the ability to emit spatial force distributions with a strength in the pico Newton to nano Newton range on the solvent and guest-molecule atoms, preferably in the range of from about 5 pN to about 10 nN, to create local density undulations and oscillations in the solvent, for example a permanent-magnetic material. Such materials include for example magnetic grades of stainless steel, e.g., ferritic stainless steel, carbon steel, plain steel, magnetic iron, cobalt, nickel, neodymium and the like.

Typically, in condensed-phase systems (e.g., liquid, solids—whether amorphous or crystalline), the prevailing magnitude of intermolecular forces is of the order of nano Newtons, which stabilise the systems in their phase state and tend to have the free energy of the system at least in a local, if not global, minimum—meaning that they system is at least metastable. The presence of pico- to low nano-Newton forces i.e., circa 5 pN to 10 nN, acting on the constituent atoms of solvent and guest molecules in the liquid-guest system by virtue of distributed surfaces, such as Coulombic, magnetism, etc, means that these forces typically range up to several percent of those present naturally in condensed-maters systems, arising naturally from intermolecular forces. Such a range lies in a "sweet spot" of forces necessary, primarily in the "linear-response regime" of non-equilibrium, in-field statistical mechanics, to shift the free-energy landscape (altering relative heights of local minima thereof, e.g., for long-lived presence of nanoclusters), Hamiltonian (e.g., intermolecular-bonding strength in solvent) and dynamical properties of the system (e.g., molecular mobility). In such a way, forces in this range can be tailored in magnitude and nature to influence the prevalence, magnitude, and speed of the necessary density oscillations near guest-solvent interfaces to capture the gest species—and the speed at which these molecular rearrangements occur—all influencing the composition, population and underlying structure of the nanoclusters. In particular, the opposing densification effects of magnetic Lorentz forces on the liquid and fluid-state guest, as well as the (sub-) micro-second and micro-metre hydrodynamic contact with the local spatial distributions of force of varying character are advantageously manipulated as described herein to overcome (i.e., "bypass" or "subvert" in terms of much faster guest-to-solvent mass-transfer speed) the molecular rearrangement and diffusional timescales—creating less ordered nanoclusters compared to nano-bubbles or droplets.

Alternatively, or additionally, the surfaces may be treated, e.g., coated with a coating with an in-built spatial distribution of Columbic character, to provide or enhance the ability to emit the spatial force distributions and/or to manipulate the character of the spatial force distributions. Suitable coatings may comprise resins such as rosin, fluoropolymers such as polytetrafluoroethylene, polypropylene, polyethyleneterephthalate, wax such as carnauba wax or beeswax or other material which permanently retains memory of internal surface charge or polarisation such as p-n junction materials like doped silicon layers, wherein the coatings are adapted to possess a permanent polarisation in a particular direction or excess charge. Typical intrinsic Coulombic-field intensities advantageous for nanocluster formation are of the order of from about 1 kV/m to about 5,000 kV/m within 1-3 cm of the surfaces.

Additionally, or alternatively, the plurality of surfaces comprises packings coated with a coating with an electrically insulating character, generally of thickness in the range of from about 0.2 mm to about 0.8 mm. Suitable electrically insulating coatings may comprise for example polymers such as polyethylene, polypropylene, polyvinylchloride and polytetrafluoroethylene.

The coatings described herein, of whatever defined character, may each independently be spray-deposited onto an underlying surface, such as a structured or random packing, using, for instance, electrostatic spray deposition (ESP), preserving surface charge and/or polarisation—with these important latter quantities advantageously in the range of from about mC/m$^2$ to about 0.2 C/m$^2$ and from about 0.1 (Cm)/m$^2$ to about 200 (Cm)/m$^2$, respectively.

Magnetron sputtering and electrostatic spray deposition of coating materials may be used when surfaces with charged and polarised character are required. The typical width of these dielectric and charged or polarised layers—all of which have pronounced Coulombic character—is from about 0.1 mm to about to 0.3 mm thick.

Spray-sputtering and painting may be used to coat the surfaces with solvophobic coatings, solvophilic coatings, or both, for example, wherein the surfaces are coated using spray guns so as to have surface-packing densities (i.e., coverage) of the order of 5-15%. The typical thickness of these layers is of the order of 0.1 to 0.3 mm thick. Again, surface charge and/or polarisation are advantageously in the range of from about 5 mC/m$^2$ to about 0.2 C/m$^2$ and from about 0.1 (Cm)/m$^2$ to about 200 (Cm)/m$^2$, respectively.

Dielectric properties and alternating solvo-phobic/philic character of the surface coatings may also be tailored and manipulated. For example, a combination of magnetic surfaces in the form of suitably shaped rods, packings and other inter-phase mass-transfer geometries may be provided with dielectric coatings to produce polarisation and charge/solvent-interaction distributions promoting guest-liquid (inter-phase) mixing. Suitable dielectric coatings include for example ceramics or glass or one or more polymers selected from among polyethylene, polypropylene and polytetrafluoroethylene, all with a low dielectric constant, i.e., less than about 3-3.5 for the relative dielectric constant, that is less than that of silica, which is ca. 4. Preferred dielectric-layer thicknesses are in the range of from about 0.2 mm to about 0.6 mm.

A low-dielectric-constant material is often beneficial to protect the surface, including any direct electrical contact with the solvent in the case of an electrical connection to said surface. In addition, one or more low-dielectric-constant materials may be used as a surface coating atop an underlying surface having other spatial force distributions emanating therefrom, e.g., charged and/or magnetic character. Without being bound by theory, it is thought these low-dielectric surfaces reduce the intensity of the Coulombic lines of force only minimally—which has the advantage of less attenuation in the intensity of the spatial force distributions into the solvent and less reduction in nanocluster generation. This allows for Coulombic-field intensities of the order of $10^3$ to $10^7$ V/m to be attenuated only very slightly, and to project further into the liquid/guest-medium phase mixture; all other things being equal, this magnifies the effect of electrostrictive action, enabling more rapid and effective nanocluster generation. To act as surface coatings, the low-dielectric-constant materials may be deposited by a variety of methods onto packings and surfaces, such as ESP, regular spray deposition, and, in the case of glass and ceramics, plasma, ion-beam and laser-beam treatments may be used for surface deposition.

In embodiments wherein the surfaces are made of a material which itself already has dielectric character, permanent polarisation or excess charge, then there is less need to have a coating of that type. As noted above, particularly favourable dielectric constants are 3-3.5, whilst surface charge and/or polarisation are advantageously in the range of from about 5 mC/$m^2$ to about 0.2 C/$m^2$ and from about 0.1 (Cm)/$m^2$ to about 200 (Cm)/$m^2$, respectively, resulting in efficient nanocluster generation.

The surfaces are most preferably made from a material which intrinsically possesses the ability to emit spatial distributions of magnetic character to weaken hydrogen-bonding and intermolecular strength/forces in the solvent thus rendering the solvent somewhat less dense and also less viscous, at least locally, and increasing both the likelihood and amplitude of density fluctuations. This eases flow hydrodynamics and even the "pliability" of essentially hydrodynamically quiescent liquid (i.e., essentially still, apart from more passive background convection) to have nanoclusters generated therein—and also in flow situations.

If the surfaces are not made of a magnetic material, a magnetic material, e.g., iron dust, may be coated atop another underlying material, e.g., by magnetron sputtering or electrostatic spray deposition incorporating the magnetic-material. In this embodiment, preferred coatings are from about 0.3 mm to about 0.7 mm thick with magnetic-material (e.g., iron dust) compositions in the range of from about 8 wt. % to about 12 wt. %.

The interplay of permanent internal magnetic and charged, e.g., Coulombic, spatial force distributions achieves greater de- and re-densification of the solvent: magnetic force distributions make the mother liquid less dense (with Lorentz forces weakening the forces between molecules, e.g., hydrogen bonds) although tends to densify the inherently more compressible guest-medium phase, whilst Coulombic force distributions render more dense (via electrostriction, or entropy-reducing dipolar alignment and electron-cloud overlap of neighbouring molecules). Paradoxically, these diametrically-opposed 'density-reordering' effects tend to create local density undulations and oscillations in space, and these resultant spatial and temporal density fluctuations enhance the ability to destabilise macroscopic droplets, clusters and bubbles—in layman's terms, making them more "pliable" for "cannibalisation" at their outer periphery to allow for the macroscopic clusters and bubbles to be broken up into sub-populations of nanoclusters.

In embodiments wherein permanent magnetic and/or charged, e.g., Coulombic, character is present, these may be enhanced by internally-generated current and/or an electromagnet feature. For example, paddle wheels may be used as a dynamo set-up (i.e., Faradaic induction of a rotating permanent magnet) to generate internal spatial distributions of Coulombic character, as well as to provide current of given polarities for the generation of spatial Columbic distributions internally. This is the case for explicit or passive solvent flow, and "micro-paddles" (micro-dynamos) can be placed atop rising populations of macro-bubbles or -droplets of the guest medium. In this way, single, possibly unsheathed electrodes may be used, or alternatively anode and cathode with one or both sheathed, with internal spatial distributions of Coulombic character, with preferred strengths in the range of $10^4$ to $10^6$ V/m.

In some embodiments, single or multiple batteries, preferably rechargeable batteries, may be used to provide internal spatial distributions of Coulombic character to assist in generation of the solvated nanoclusters. Here, the or each battery, independently, is preferably located upstream of a means for generating or enhancing fluid-solvent turbulence, or of the plurality of surfaces, with independent wire connections to the downstream surfaces, such as structured or random packings. In this embodiment, the wires are preferably stranded wires and may optionally be connected to a power source external to the volume, optionally wherein a single unsheathed electrode is included without connecting the electric circuit and initiating electrolysis of the solvent. The battery, or plurality thereof, may have a total voltage of from about 6 V to about 48 V, and may also be advantageously employed with a pulse-width modulator.

In some embodiments, solvophobic and/or solvophilic regions may be tailored onto surfaces via a range of deposition methods, for a desired spot-coverage level (typically in the range of from about 5% to about 15%, featuring spot dimensions of approximately 1-3 mm). Depending on the solvent, suitable materials for deposition include peptides, mica, halite, quartz, trona, silica and titania as well as acrylics, epoxies, polyethylene, polystyrene, polyvinylchloride, polytetrafluorethylene, polydimethylsiloxane, polyacrylic acid or vinyl acetate acid, polyesters, and polyurethanes, as well as manganese oxide polystyrene ($MnO_2$/PS) nanocomposite and zinc oxide polystyrene (ZnO/PS) nanocomposite. Suitable surface-coating/deposition methods include, inter alia, plasma coating, chemical etching, solution-immersion processes and spray coating. Preferred solvo-phobic/philic-region thicknesses are in the range of from about 0.2 mm to about 0.4 mm.

For use with water as solvent, the surfaces may possess differing levels of hydrophobic and hydrophilic character to promote different levels of species-specific capture from the bulk fluid guest medium. In other words, the hydrophobic and hydrophilic character of the surfaces may be aligned with the hydrophobic and hydrophilic character of the guest. For example, superhydrophobic surfaces preferentially capture methane in water. By superhydrophobic is meant upon which the contact angles of a water droplet exceed 150°. For clathrate-hydrate nanoclusters, alternating hydrophilic and hydrophobic surfaces may be effective.

In some embodiments, polarised surfaces may be created by electro-spinning with a polymer melt, e.g., molten polytetrafluoroethylene. Preferred levels of surface-polarisation density for efficient nanocluster generation are generally in the range of from about 0.1 (Cm)/$m^2$ and about 200 (Cm)/$m^2$.

Particularly preferred embodiments for the plurality of surfaces include:

(i) structured packings comprising ferritic stainless steel covered by electro-oriented/charged polytetrafluoroethylene, with magnetic Intalox saddles randomly distributed between the structured packing and coated similarly; preferably wherein the packing density is in the range of from about 80 $m^2/m^3$ to about 450 $m^2/m^3$, and/or wherein the structured packings comprise corrugated structured packing, e.g., with 40-60° corrugation angle and packing thickness of 0.06-0.15 mm and surface area of 200-300 $m^2/m^3$, additionally or alternatively wherein the polytetrafluoroethylene coating is of a thickness in the range of from about 0.2 mm to about 0.3 mm;

(ii) magnetic Raschig rings and Berl saddles mixed with a series of magnetic static mixers, with the static mixers connected to an internal electric source such as a paddle-wheel, battery, dynamo, etc., to enhance the turbulence and effectiveness of guest-solvent mixing in flow situations, thus boosting the effectiveness of inter-phase mass-transfer kinetics greatly; preferably wherein the surfaces are packed at a density in the range of from about 700 $m^2/m^3$ to about 1,500 $m^2/m^3$, alongside preferably 12-48 V from the internal power source; and (iii) in the case of selective capture of hydrophobic guests, a combination of structured packing of ferritic steel covered in superhydrophobic paint, preferably with a wetting contact angle exceeding 150°, and connected to an internal electric source (preferably 12-48 V), and random packing, such as Berl saddles (with preferred packing density in the range of from about 100 $m^2/m^3$ to about 220 $m^2/m^3$), with electro-oriented/charged polytetrafluoroethylene (e.g., 50-150 Cm/$m^2$) that has spot surface coverage (e.g., 15-20%) of superhydrophobic paint (e.g., thickness in the range of from about 0.2 mm to about 0.4 mm).

In some embodiments, one or more photovoltaic panels or printed circuit boards may be provided within the volume to mechanistically promote the density undulations in the solvent required for the generation of nanoclusters.

The single, or each, photovoltaic panel or printed circuit board may be laminated or waterproofed, or both, to prevent direct contact of the solvent with the underlying photovoltaic or board material, for example silicon, preferably wherein the photovoltaic panel further comprises acrylic sheets bonded onto polyethylene back planes, with anode and cathode mesh connections on either side of the photovoltaic material sandwiched in between.

In this embodiment, the spatial Coulombic distributions, coupled with manipulation of the solvo-phobic or -philic nature of the surface-lamination coating allow for control of the degree of Coulombic and solvo-phobicity/philicity—depending on the type of surface features one wishes to combine for selective capture of guests in the vicinity of PV-panel printed-circuit-board surfaces. For instance, by increasing the thickness of the coating from 0.3 mm to 1 mm, a more solvophobic character is favoured, meaning greater incorporation of solvophobic species into the resultant nanoclusters. Additionally, a plurality of permanent magnets, preferably of the order of from about 1 mm to about 4 mm in dimension, may also be fixed to the panel with preferred coverages of from about 5 to 10% to confer magnetic character thereto. This is especially preferably for nanocluster generation in more viscous solvents, i.e., with viscosity typically greater than 5-10 cP, or with especially solvophobic guests, i.e., with wetting contact angles over around 160°.

The photovoltaic panel may absorb incident light or be operated in "reverse" mode, and/or the printed circuit board, supplied by a DC power source internal to the volume under low-light conditions—typically in the range of from about 6 V to about 24 V, with possible DC-signal rectification in the range of from about 50 MHZ to about 200 MHz.

In some embodiments, the volume has at least two inlets and an outlet, wherein the solvent is introduced into the volume via a first inlet and the fluid medium is introduced into the volume via one or more further inlets such that the fluid medium mixes with the solvent in the volume.

The volume is made of a material compatible for use with the solvent. Preferably the volume is made of plastic such as polyvinyl chloride, polyethylene terephthalate (PET), high-density PET or polypropylene. However, this is not to be considered limiting and other materials may be used.

In some embodiments, the volume is evacuated using a vacuum means prior to introduction of the solvent.

In some embodiments, larger clusters, e.g., micron-sized clusters, of guest molecules may be generated using flow-turbulence mixing enhancers, e.g., one or more jet nozzles, Venturi screws, air/gas (vacuum-type) valves, static mixers, spargers or the like, in an intermediate step when forming the solvated nanoclusters, such that medium-solvent mixing is enhanced. In these embodiments, the solvent contains macroscopic bubbles or droplets, e.g., micron-sized bubbles, from which nanoclusters may be generated more quickly than from bulk guest fluid, e.g., by entropic frustration.

The solvent is preferably selected from among water, alcohols such as bio-ethanol, calorific fuels such as 80- to 110-octane petroleum, diesel and bio-diesel and amines, preferably amines such as monoethanolamine, 2-(butylamino)ethanol, 2-(isopropylamino)ethanol, and 2-(ethylamino)ethanol. Such amines have $CO_2$-solubility characteristics favoured for the creation of $CO_2$-nanoclusters. In the embodiment wherein the solvent is water, the water may be any of deionised, seawater, wastewater, or municipal water or a mixture thereof.

In the preferred embodiment wherein the solvent is water, enhanced growth of biological species uptaking water containing nanoclusters may occur. Other species dissolved in the water, as well as suspended solids and nano- and micro-particulates, may adsorb to the surface vicinity of the nanoclusters.

In the method according to the invention, excess-solubility guest nanoclusters may be accommodated in the solvent as hydrate/solvate quasi-crystallites as well as fluid-guest-containing nanoclusters of fluid or amorphous solid character, these being composed of an intermingling and complexation of solvent molecules with the guest, or solvent molecules ordering the guest molecules.

Without being bound by theory it is assumed that this is due to the more rapid—and chaotic—formation phenomena (and kinetics) of nanoclusters compared to nanobubbles and droplets. When a magnetic character is present, the magnetic character weakens intermolecular bonding—and this facilitates substantially more rapid rearrangements of the near-molecular-environment "coordination shell". However, the opposing effect of the magnetic spatial force distributions on the density of the liquid and the fluid guest (dispersed) phase, with respective decrease and increase, serves to amplify the density undulations and lead to more rapid (pressure-reestablishment-driven) density adjustments—i.e., very rapid ingress of guest into the mother solvent, exceeding diffusion timescales necessary to lead to the formation of nano-bubbles or -droplets.

In order to obtain "molecularly-mixed" nanoclusters, the magnetic character, magnetic Lorentz forces approaching about 1-10 nano Newtons acting on the solvent and guest molecules' atoms is needed, typically about 0.2-0.5 T (which corresponds to forces approaching of the order of about 1% of intermolecular forces acting on constituent atoms in the solvent molecules). This is to ensure that diffusive mixing is fast enough to overcome the entropic urge to order more at the nanoscale into perfect spheres of segregated guest (whether as a nanobubble or nanodroplet).

In the case of generating solvated nanoclusters using the method according to the invention from solvophobic guests, e.g., wherein the solvent is water and the guest fluid medium is methane, the presence of distributed packings with solvophobic coatings greatly reduces the likelihood that nanobubbles or droplets could form, as the close molecular proximity of water and methane stabilises clathrate-hydrate cages—which makes the nanoclusters more stable.

Nanoclusters generated using the methods according to the invention may be gas-hydrate crystallites in character, albeit being effectively 'frustrated' entropy-limited solvated complexes, without being able to form a fully crystalline state—'quasi' gas-hydrate crystallites that are semi-amorphous in nature with near-range ordered characteristics in their local "coordination shell"—i.e., still with residual structured-liquid character for solvate molecules in and near these nanoclusters. Another example is incipient solution crystallisation, whereby solvated nanoclusters of quasi-crystallised and nanoscale solvate are kinetically arrested—yet another instance of kinetic frustration arising from suppression of diffusion by rapid density/pressure readjustment—and these resultant nanoclusters retain some liquid- or amorphous-like character. In the case of solvated guest-containing nanoclusters being more fully fluid-phase nanodomains, there is still a complexation and intermingling/interpenetration of solvent and guest with a level of mutual miscibility, density fluctuations and capillary phenomena at the nanoscale. Therefore, the non-equilibrium nature of excess accommodation of guest species in liquid at the nanoscale is emphasised, with the nanostructuring of the guest molecules by those in the solvent being a key and universal feature. In this sense, nanoclusters are the universal non-equilibrium nanoscale phenomenon of excess-solubility guest accommodation, whilst nanobubbles and/or nanodroplets are merely more ordered subset of the universal class of nanoclusters.

The fluid guest medium may be a gas medium, preferably wherein the gas medium comprises a mixture of two or more gases, particularly preferably wherein the gas medium comprises two or more gases from among the following list: nitrogen, oxygen, carbon dioxide, ozone, carbon monoxide, hydrogen sulphide, hydrogen, propane, air, tetrahydrofuran, flue gas, raw biogas and methane.

Preferably, the amount of at least one of the gases is higher than that of the other gas or gases, for example such that the ratio of two gases is 4:1. In a particularly preferred embodiment wherein the medium is air, the ratio of nitrogen to oxygen is about 4:1 in favour of nitrogen compared to oxygen.

Alternatively, the fluid guest medium may be a liquid medium, preferably wherein the liquid medium is a mixture of two or more liquid components. Preferably, at least one of the liquid components is present in a higher amount than the other(s).

In some embodiments, the fluid guest medium may comprise a multi-phase fluid mixture.

The method may be performed by generating the nanoclusters in batch mode or under flow conditions. By "under flow conditions" is meant flowing the solvent and medium through the volume containing the plurality of surfaces. In this preferred embodiment, the solvent flows actively under "forced" convective momentum transfer, such as pumping, or else by passive convection, i.e., the normal convection currents present in a body of water.

Preferably, the solvent and medium flow through the volume, with typical flowrates of from 0.5 to 100 l/min in vessels with internal volumes of 10-200 litres. In this embodiment, the surfaces may comprise tubular or open-channel flow-over surfaces mounted within the volume such that the solvent flows therethrough, preferably wherein further surfaces comprising packings like Raschig rings or Intalox saddles are present in the volume such that they are submersed in the solvent to enhance fluid-solvent inter-phase mass transfer and turbulence mixing on a macro- and nano-scopic level. Alternatively, the surfaces may be mounted within the volume such that the solvent flows over the surfaces, wherein the solvent is in contact with the guest fluid phase above and the active surface below. By 'active surface' is meant the surface possessing one or more of magnetic, charged, dielectric, polarised, solvophobic, solvophilic and dipolar character, preferably wherein the surfaces emit one or more spatial force distributions with a strength in the pico Newton to nano Newton range on the atoms of the solvent and guest molecules in the range of up to no more than 3-4 percent of normal, phase-appropriate (e.g., liquid, gas, etc) intermolecular forces to create notable local density undulations and oscillations in the solvent—with implications for effective and accelerated guest capture therein.

In some embodiments, a triboelectric effect may be exploited to generate high intensities of Coulombic spatial distributions—i.e., an intense intrinsic electric field in the volume. In some embodiments, an internal energy source is located in the volume. For example, a conveyor-type strip provided with angled paddle features mounted thereon is placed within the volume so that when the solvent is introduced to the volume, the solvent flow (whether horizontal, vertical or at an angle) induces the strip to travel around a circuit like a bicycle chain (i.e., momentum capture and transfer). The different materials of the axle-mounted wheels induce the triboelectric effect, which then allows very rapid electrostriction to occur with Coulombic force distributions of the order of from about $10^6$ V/m to $10^7$ V/m in their electrostatic-field strength. This "momentum-to-triboelectric" transfer may also be conducted on a smaller scale in the vertical plane with upward-rising guest macro-bubble/-droplet populations. Without being bound by theory, the very high strengths of internal spatial distributions of Coulombic character so generated, i.e., in the order of from about $10^6$ V/m to $10^7$ V/m, lead to enhanced and rapid electrostrictive capture of the guest from the macro- or meso-scale bubbles/droplets into nanoclusters.

In some embodiments, the solvent may flow through a plurality of surfaces located within the volume, preferably wherein the surfaces are channels located between two parallel capacitor plates, wherein the capacitor plates are mounted above and below the plane of fluid flow and are connected to an external or internal power source. In these embodiments, the channels are preferably made of a low-dielectric material, e.g., with a dielectric constant of 2.5-3.5, such as polytetrafluoroethylene, to allow for the least reduction in intensity of spatial distributions of Coulombic character. This allows for electrostriction to act efficiently, whilst "retro-fitting" banks of flow channels without the need to embed electrodes therein. Optionally, and advantageously, packings described hereinabove may be placed inside the channels, dimensioned suitably such that the maximum packing diameter is no more than half of the minimum channel cross-sectional dimension, affording an effective voidage in excess of 85-90%.

In some embodiments, the solvent may flow along a plurality of surfaces fixedly mounted within the volume, preferably wherein the surfaces are elongate structured packing elements such as knitted wire, corrugated or gauze types, e.g., downward-cascading elements for the solvent to flow along, such that the solvent comes in contact with the fluid phase above and the elements below to generate nanoclusters. Further highly suitable and effective elements include rods, coils, meshes and hollow tubes. The elongate elements may be mounted at any angle, e.g., horizontal, vertical or diagonal, so as to achieve a volume-averaged voidage of not less than 85%.

In some embodiments, the contents of the volume may be agitated by a fluid-liquid contact by an agitator, rocker or on inter-phase mass-transfer packings, preferably using a mechanical agitator. Without being bound by theory, the mechanical agitation is considered to render the solvent turbulent to improve solvent-medium contact, which leads to higher nanocluster-formation yields. Suitable mechanical agitators include radial-flow impellers, such as Rushton turbines, and axial-flow impellers, as well as vortex motion and paddles.

Gas pumps, turbines, compressors or the like may be used to introduce the fluid guest medium into the volume or to create further fluid-solvent turbulence, e.g., for mechanically-mediated macroscale mixing of the fluid guest medium and solvent, or both.

The method is preferably conducted at temperatures and pressures at which the solvent is thermodynamically stable, for example at temperatures between about 0° C. and about 40° C., preferably between about 5° C. and about 20° C., particularly preferably between 10° C. and 20° C., and pressures between 1 and 80 bar, preferably between 1 to 5 bar, e.g., 3 bar, depending on solvent. It will be appreciated that these ranges are exemplary only and not to be considered limiting on the scope of the invention and higher pressures and temperatures could be used. In the specific case of generating gas-hydrate nanocrystallites, i.e., wherein the solvent is water, the temperature of the water is above 0° C. and advantageously below 10° C., preferably in the range of from 1° C. to 5° C.

In some embodiments, the solvent containing nanoclusters is cooled to a predetermined extent to facilitate storing nanoclusters within the solvent, preferably wherein the solvent containing nanoclusters is frozen. The solvent may be cooled by circulating a coolant agent around the volume, for example though a cooling jacket or passageway around the volume. In a particularly preferred embodiment, the coolant is as a mixture of water and ethylene glycol. However, this is not considered to be limiting and other coolants may be used within the scope of the invention. The coolant is preferably circulated at a temperature range of from about 263 K to about 290 K, and, in the case of solvate/hydrate nanocluster formation, more optimally in the range of from about 274 K to about 280 K.

In a preferred embodiment, the nanoclusters are frozen for facilitating storage. For example, for longer-term storage (in terms of months), or for transport of the solvent containing nanoclusters, solvent containing nanoclusters may be (quench-) frozen straight after taking it out of the volume and subsequently thawed out for use later.

Facile, controlled and on-demand extraction of guest species from solvated nanoclusters, alongside their adsorbates, may be accomplished by applying either an acoustic-sonication pulse or electromagnetic signal or an addition of certain chemical agents (e.g., surfactants) which serve to alter the surface tension in the liquid volume abruptly. This process is delivered to the contents of volume containing the nanoclusters.

In a preferred embodiment, a chemical agent, such as a surfactant, may be added to the solvent to release the guest from the nanoclusters from the solvent. Preferred chemical agents include sodium sulphite, sodium(meta)bisulphite, calcium chloride, sodium hydrogen carbonate, ascorbic acid, salts, carbohydrazide, erythorbate diethylyhydroxylamine, hydroquinone, potassium hydroxide and calcium hydroxide.

In an alternative preferred embodiment, an acoustic-sonication pulse or electromagnetic signal is applied to the solvent to release the guest from the nanoclusters from the solvent. The acoustic-sonication pulse is preferably applied at a frequency in the range of from about 5 kHz to about 300 kHz, at a force in the range of from 5 N to about 50 N.

After the signal or additive chemical has been applied for a suitable determined period, for example in the range of from 5 minutes to 3 or 4 hours, depending on the amplitude of sonic energy or over-saturation of chemical beyond the guest-dissolved stoichiometrically-equivalent limit, the nanoclusters are completely extracted from the solvent such that volume predominantly contains solvent. Not only is this extraction method sufficiently facile and controllable, but it also allows for extraction over periods of time which far precede the nanoclusters' metastability—extending to timescales of months. Furthermore, these techniques for extracting nanoclusters of the guest species are energy-efficient.

Thus, in another further aspect, the invention relates to a method of releasing solvated nanoclusters from a liquid; the method comprising the generation of solvated nanoclusters as described hereinabove, and subsequently controllably releasing the nanoclusters by applying either a chemical agent such as a surfactant or a signal to the liquid solvent and nanoclusters, wherein the signal comprises an acoustic sonication signal, an electromagnetic signal, or both, wherein the, or each, signal independently has a frequency in the range of from about 1,000 Hz to about 300,000 Hz.

It is submitted that guest nanoscale solvation and dissolution according to the present invention has clear applications many industries, including wastewater, agriculture, oil/gas and in the gas-storage industry, as well as significant use in reducing industrial carbon emissions. The ability to capture species from fluid guest medium in nanoscale form at any pressure in the range of from atmospheric pressure up to hundreds of bar is an important characteristic.

In another aspect, the invention provides a generator for producing nanoclusters using the method described hereinabove; the generator comprising a volume containing a plurality of surfaces distributed therein, a solvent inlet for introducing solvent which the solvated nanoclusters are to be generated into the volume such that the solvent comes in contact with the surfaces; and a fluid guest medium inlet for introducing a fluid guest medium into the volume for distribution within the solvent, wherein the surfaces possess one or more of magnetic, charged, dielectric, polarised, dipolar and alternating solvophobic and solvophilic character such that they emit one or more spatial force distributions with a strength in the pico Newton to nano Newton range on the atoms in the solvent and guest molecules, up to no more than 3-4% of intermolecular forces acting on these atoms normally in liquid and fluid-phase solvent and guest, respectively—to create local density undulations and oscillations in the solvent, as outlined above.

The volume, surfaces, solvent and fluid guest medium are as described hereinabove.

In a particularly preferred embodiment, the plurality of surfaces comprises surfaces arranged in a parallel configuration, preferably wherein the surfaces are in a mesh configuration, preferably wherein each mesh element comprises an aperture for receiving a portion of a means for delivery of the fluid medium, particularly preferably wherein the means for delivery of the fluid medium comprises an elongated tubular member for extending through the apertures of the mesh elements and optionally wherein the means for delivery of the fluid medium comprises a plurality of outlet apertures for facilitating the distribution of the medium within the volume.

Preferably, the generator further comprises a source for supplying the fluid guest medium to the volume for distribution within the solvent. Alternatively, ambient air may be the fluid guest medium provided to the generator.

In some embodiments, the source comprises a gas source for supplying a gas medium.

In some embodiments, the source comprises a liquid source for supplying a liquid medium.

In embodiments wherein the surfaces possess permanent magnetic and/or charged, e.g., Coulombic, character, the generator preferably further comprises an internally-generated current and/or an electro-magnet feature such as paddle wheels as a dynamo set-up. The thus-generated DC voltage may be of the order of from about 6-48 V, and may include signal-rectification characteristics. In a preferred embodiment, micro-dynamos may be placed such that in use of the generator they are located atop rising populations of macrobubbles of the guest medium. In this embodiment, single, possibly unsheathed electrodes may be used, or alternatively anode and cathode with one or both sheathed, emanating therefrom internal spatial distributions of Coulombic character, typically with field strengths of the order of $10^4$-$10^6$ V/m.

In some embodiments, the generator may comprise means for generating fluid-solvent turbulence, e.g., one or more jet nozzles, Venturi screws, air/gas (vacuum-type) valves, static mixers, spargers or the like.

In some embodiments, the generator may comprise single or multiple batteries, preferably rechargeable batteries, to provide internal spatial distributions of Coulombic character (featuring typical strengths of the order of $10^3$ to $10^6$ V/m) to assist in generation of the solvated nanoclusters. The or each battery independently is preferably located upstream of a means for generating or enhancing fluid-solvent turbulence, or of the plurality of surfaces, with independent wire connections to the downstream surfaces, such as structured or random packings. In this embodiment, the wires are preferably stranded wires and may optionally be connected to a power source external to the volume, optionally wherein a single unsheathed electrode is included without connecting the electric circuit and initiating electrolysis of the solvent.

In some embodiments, the generator comprises a vacuum means for evacuating the volume prior to introduction of the solvent and fluid guest. This permits accurate monitoring of the resultant headspace-fluid concentration and optionally pressure.

In some embodiments, an agitating means is provided for agitating the contents of the volume, preferably wherein the agitating means comprises a mechanical agitator. Without being bound by theory, the mechanical agitation is considered to render the solvent turbulent to improve solvent-medium contact, which leads to higher nanocluster-formation yields. Suitable mechanical agitators include radial-flow impellers, such as Rushton turbines, and axial-flow impellers, as well as vortex motion and paddles.

Gas pumps, turbines, compressors or the like may be used to introduce the fluid guest medium into the volume or to create further fluid-solvent turbulence, e.g., for mechanically-mediated macroscale mixing of the fluid guest medium and solvent, or both.

The contents of the volume are preferably agitated by a fluid-liquid contact by an agitator, rocker or on inter-phase mass-transfer packings.

In a preferred embodiment, the generator further comprises a cooling means for cooling the contents of the volume, preferably wherein the volume is provided with an external cooling jacket or passageway through which a cooling agent may be circulated.

In some embodiments, a detachable storage volume for storing the nanoclusters in a temperature-controlled environment may be connected to the generator.

In some embodiments, the generator is controlled by a control circuit. The control circuit allows, in the case that internal electric source is used, by means previously described, to be switched on and off and for the voltage (and potential rectification thereof) to be varied. This can be in response to the level of nanoclusters generated and on any downstream effects of the nanoclusters on the application(s) for which the generator is used.

The method and generator according to the invention may be used to capture $CO_2$ and pollutants from flue-gases or $CO_2$-rich gases, and also from air, in solvents. For this species-selective capture in the form of nanoclusters, the plurality of surfaces comprise solvophobic surfaces (with surface coverage of the order of 15% in 1-2 mm 'spots') combined with Coulombically coated surfaces (typically in the range of from about 0.3-0.6 mm thick, with the surface-charge and/or polarisation density, respectively, ~100 mC/$m^2$ to 0.1 C/$m^2$ and ~10 (Cm)/$m^2$ to 50 (Cm)/$m^2$) atop underlying magnets (with a strength in the range of from about 0.2-0.5 T).

The method and generator according to the invention may be used to capture of gas and water in petroleum, diesel and oil-bio-based fuels. For this species-selective capture in the form of nanoclusters, the plurality of surfaces possess magnetic and Coulombic character and are coated with strongly solvophilic and hydrophilic coatings, i.e., featuring surface-wetting contact angles of 25 to 40°, so as to differentially attract gas and water and aqueous species in the fuel thereto. This maximises the amount of this capture in nanocluster form in the fuel.

In a further aspect, the invention provides a system for generating solvated nanoscale features in a liquid, wherein the nanoscale features are guest moieties in gas, liquid amorphous-solid or crystallite form and present in amounts beyond thermodynamic solubility, the system comprising a generator as described hereinabove and one or more sensors, such as for example, a temperature sensor for sensing temperature associated with the contents of the volume, a pressure sensor for sensing pressure associated with the generator and a pH sensors.

The system preferably further comprises a data-acquisition system for recording the temperature and/or pH and/or pressure monitored with said sensors at predetermined intervals.

The system preferably further comprises a storage vessel for storing the generated nanoclusters.

In some embodiments, the system comprises a control circuit in communication with the generator and with one or more of a fluid medium source, a vacuum pump, sensors such as a temperature sensor, pressure sensor or pH sensor, a data-acquisition system, a cooling means such as an isothermal bath and a storage vessel.

BRIEF DESCRIPTION OF THE DRAWINGS

Certain preferred embodiments of the present invention will now be described, by way of example only, with reference to the accompanying drawings in which.

DETAILED DESCRIPTION

Figure 1:
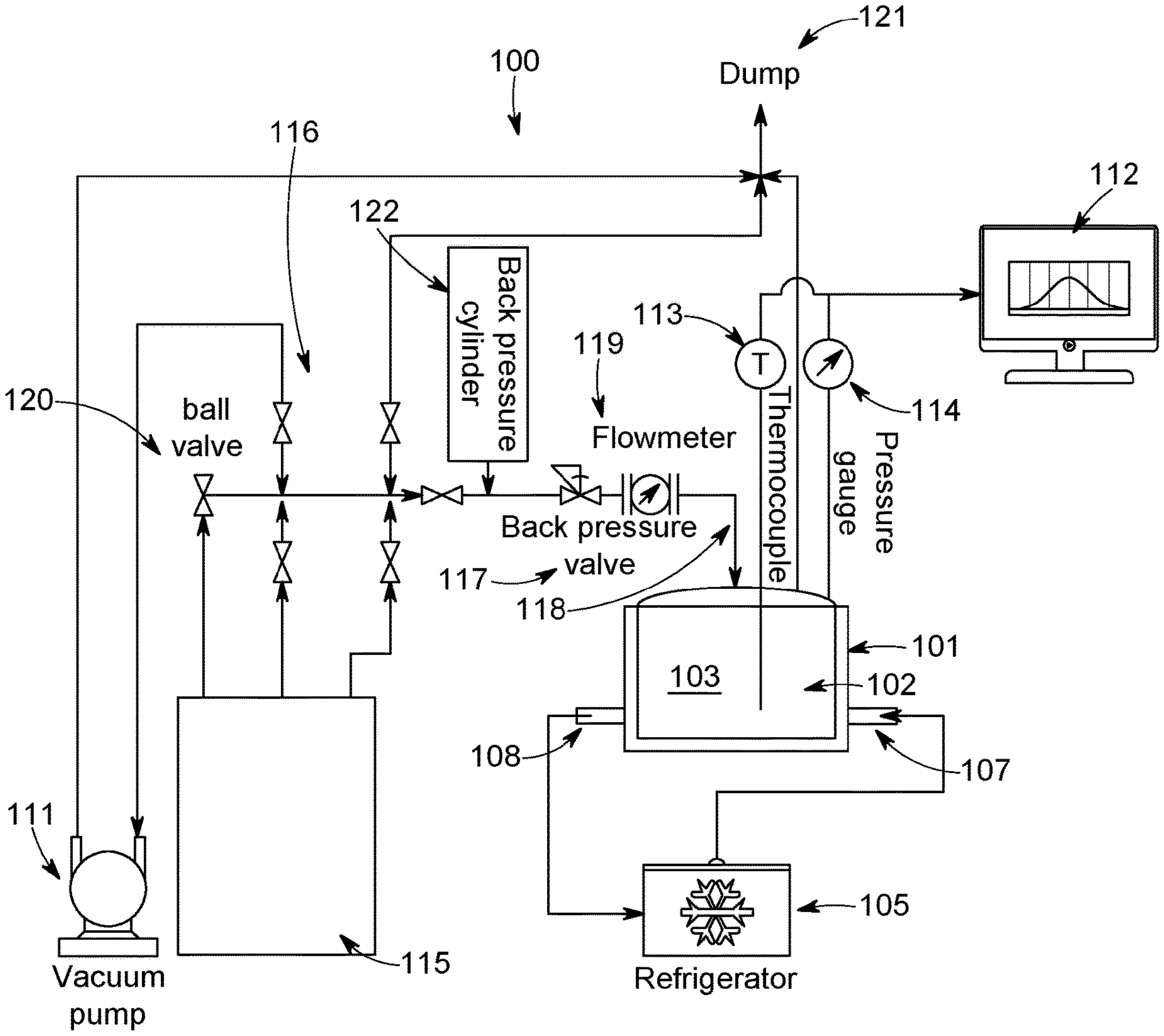
FIG. 1 is a process diagram detailing a preferred system for use in performing the method according to the invention of producing solvated nanoclusters.

It has surprisingly been found that chaotic, frustrated, irregular nanoclusters—as opposed to spherical nanobubbles/nanodroplets—may be generated by enhancing the speed of molecular rearrangement of a fluid guest medium in a solvent using spatial force distributions which are intrinsic to surfaces in contact with the solvent and medium. That is, in the method according to the invention, nanoclusters are generated by direct action of internal spatial force distributions, i.e., internal fields, on the solvent and guest medium without the need for an external field to be applied, and the nature of the surface packings enhances this process cooperatively with the character of these internal force-field distributions. The spatial force distributions act on the atoms of the solvent and guest molecules to create local density undulations and oscillations in the solvent—temporally and spatially—in addition to those oscillations arising already from hydrodynamic interactions with packings. The surfaces thus facilitate the uptake of fluid-state guest species from the medium in nanoscale form, i.e., in supersaturated nanoclusters beyond conventional liquid-state guest dissolution.

Various embodiments of the present invention will be described in detail with reference to the drawings, where like reference numerals represent like parts and assemblies throughout the several views.

It will be appreciated that the invention should not be construed to be limited to the examples, which are now described; rather, the invention is construed to include any and all applications provided herein and all equivalent variations within the skill of the ordinary artisan.

Referring to the drawings, and especially to FIG. 1, a preferred system according to the invention for generating nanoclusters is shown, generally referred to herein by reference numeral 100. System 100 comprises generator 101 provided with a vessel 102 with a hollow interior region defining a volume of about 1000 cm$^3$ which accommodates a plurality of surfaces (not shown in FIG. 1) tightly packed therein and liquid 103. Vessel 102 may be made of plastic. Liquid 103 may be deionised water, seawater, wastewater, brine water or another aqueous solution and is introduced into vessel 102 via an inlet (not shown).

Generator 101 further comprises a source 115 of a fluid guest medium in the form of a gas, liquid or supercritical fluid, to be supplied to vessel 102 for distribution within liquid 103. Source 115 may comprise single or multiple gas or liquid sources which may be selectively controlled for providing the guest fluid or combination of guest fluids to volume 102. An inlet conduit 118 facilitates the routing of the medium from source 115 into volume 102. A back-pressure valve 117 facilitates the controlled introduction of the medium from source 115 to volume 102 without the loss of liquid 103 from volume 102. A flow-meter 119 is provided for metering the flow of the medium to volume 102. In the event inlet conduit 118 is left open and source 115 is absent or disconnected, ambient air is the default fluid guest medium provided to generator 101, given that ambient-pressure operation to produce nanoclusters in the body of liquid 103 also takes place.

In the preferred embodiment shown in FIG. 1, a vacuum pump 111 is provided for evacuating volume 102 prior to introduction of liquid 103.

In use of system 100, the introduction of fluid medium from the single- or multicomponent-species fluid source 115 to volume 102 is controlled via a series of ball valves 120. Control of source 115 includes altering the series of ball valves 120 to route the gas or combination of gases to either vacuum pump 111 or a dump facility 121, should the need arise. A back-pressure cylinder 122 accommodates fluid flow if the back pressure valve 117 closes.

System 100 may be run in continuous-flow mode for both the liquid and medium, or in fed-batch mode for either.

Generator 101 further comprises a sealing means (not shown) for sealing volume 102. The sealing means may comprise a closure cap and a sealing gasket for operably engaging with the side walls of generator 101. The sealing gasket is preferably made of polytetrafluoroethylene; however, this is not to be considered limiting and other materials are contemplated for use as sealing gaskets within the scope of the invention.

In the preferred embodiment shown in FIG. 1, an isothermal bath 105 is provided for circulating a coolant through at least a portion of generator 101 through an inlet tube 107 of volume 102, though a cooling jacket or passageway (not shown) around volume 102 for cooling the contents within volume 102. The coolant is then returned to isothermal bath 105 via an outlet tube 108 of volume 102. The coolant may be a mixture of water and ethylene glycol. The coolant is preferably supplied at a temperature in the range of from about 263K to about 293K, and, in the case of solvate/hydrate nanocluster formation, more optimally in the range of from about 273K to about 283K.

A mechanical agitator (not shown) may be provided for agitating the contents of volume 102.

In the preferred embodiment shown in FIG. 1, a temperature sensor 113 is provided for sensing temperature associated with the contents of volume 102, a pressure sensor 114 is provided for sensing pressure associated with generator 101 and data-acquisition system 112 is provided for recording the temperature and pressure monitored with temperature sensor 113 and pressure sensor 114 at predetermined intervals. While FIG. 1 illustrates optional temperature and pressure sensors, it will be appreciated by those skilled in the art that additional or alternative sensors may be used to monitor other parameters which may be recorded by data acquisition system 112, for example pH sensors.

Generator 101 is controlled via a control circuit 116 in communication with source 115, vacuum pump 111, temperature sensor 113, pressure sensor 114, data-acquisition system 112, and isothermal bath 105.

FIGS. 2*a* to 2*e* each schematically show the interface of the body of liquid 103 in which the guest medium (not shown) is present at a portion of a preferred surface 104*a*, 104*b*, 104*c*, 104*d* and the different spatial force distributions emanating from that surface. Each of surfaces 104 may be organic or inorganic in nature and of variable geometry, e.g., ferritic Raschig rings 104*b* in the case of the preferred embodiment shown in FIG. 2*b*.

In each of FIGS. 2*a* to 2*d*, the z-axis represents the direction parallel to the interface with the body of the liquid 103 in which the guest medium (not shown) is present, in an effort to facilitate the formation of solvated nanoscale assemblies therein, and the x-axis is perpendicular to surface 104*a*, 104*b*, 104*c*, 104*d*, respectively.

Figure 2A:
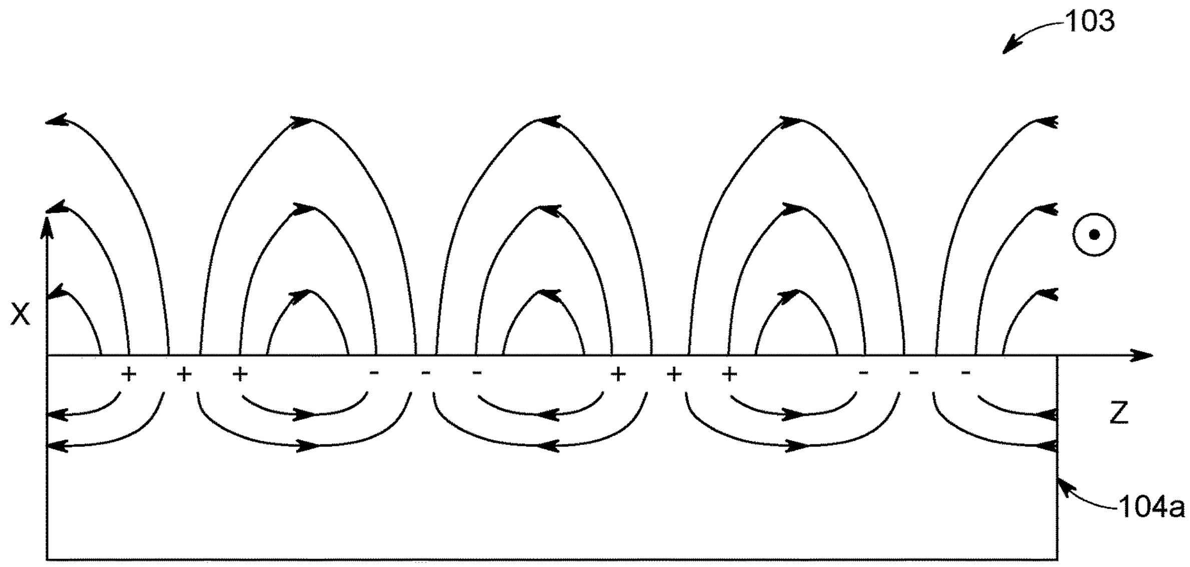
FIGS. 2*a* to 2*e* show portions of alternative preferred surfaces and the different spatial force distributions emanating therefrom.

FIG. 2*a* illustrates a portion of a surface 104*a* such as a structured or random packing, e.g., a Pall ring, which has been coated with a material which permanently retains memory of internal surface charge or polarisation, e.g., polytetrafluoroethylene or other wax-type material. This coating may be spray-deposited onto the underlying surface using electrostatic spray deposition (ESP). Alternatively, the coating may be made by exposing wax-type materials or molten polytetrafluoroethylene in a static electric field and then allowing solidification. There may be a plurality of such coatings of alternating surface charge or polarisation.

In FIG. 2*a*, networks of charges at surface 104*a* create spatial distributions of Columbic force which serve to promote the uptake of the guest species into liquid 103 in nanoscale form to differing extents (in the case of a multicomponent guest medium).

Figure 2B:
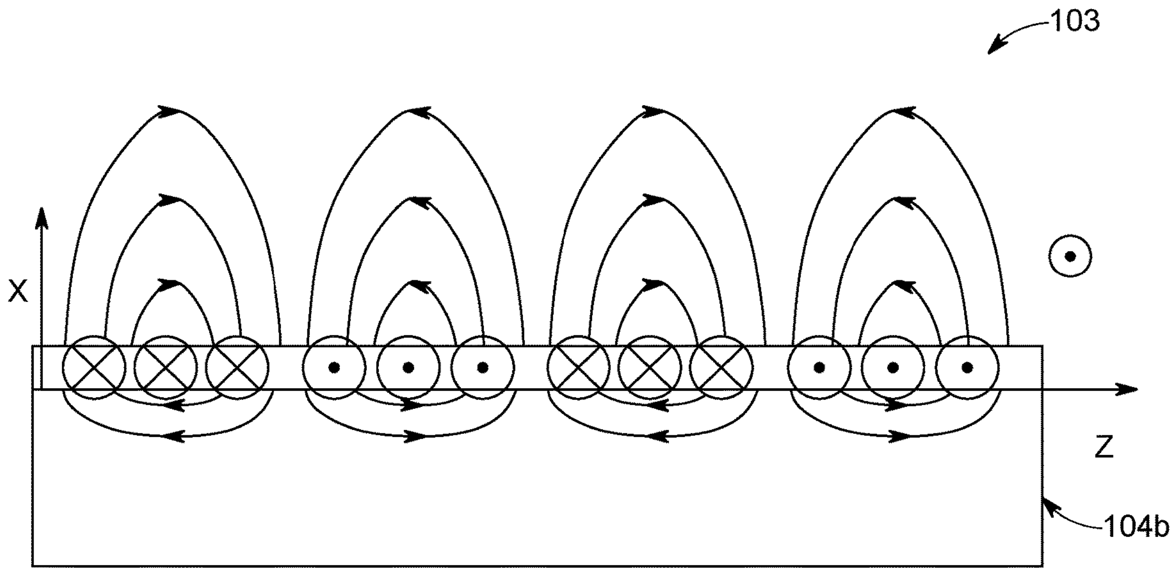

In a similar way, the presence of magnetism at surface 104*b* in FIG. 2*b* allows for a spatial distribution of magnetic force, which serves to induce restructuring in liquid 103 and refine intermolecular bonding so as to facilitate the solvent-molecule rotational and translational rearrangements necessary to facilitate formation of metastable solvated nanoclusters containing additional guest molecules. The magnetic character of surface 104*b* may be obtained using various ferritic stainless steels or carbon steel, or iron, cobalt, nickel, neodymium. The surface, e.g., packing such as Intalox saddles, may be made from this, or else a ferritic substance may be coated atop another underlying material such as ceramic or a non-ferritic metal, e.g., by magnetron sputtering or electrostatic spray deposition incorporating magnetic-material (e.g., iron) dust.

Figure 2C:
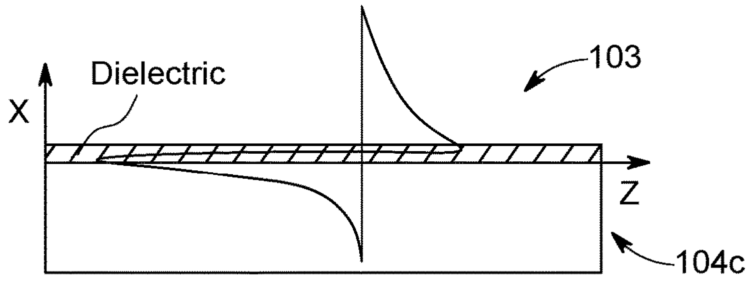

In the preferred embodiment shown in FIG. 2*c*, a dielectric coating or paint is applied to surface 104*c* to modulate the magnitude of the lines of Coulombic and magnetic force.

Suitable coating materials include ceramics or glass or polytetrafluoroethylene, typically polyethylene, polypropylene and polytetrafluoroethylene, all with a low dielectric constant, i.e., less than about 3-3.5 for the relative dielectric constant.

Figure 2D:
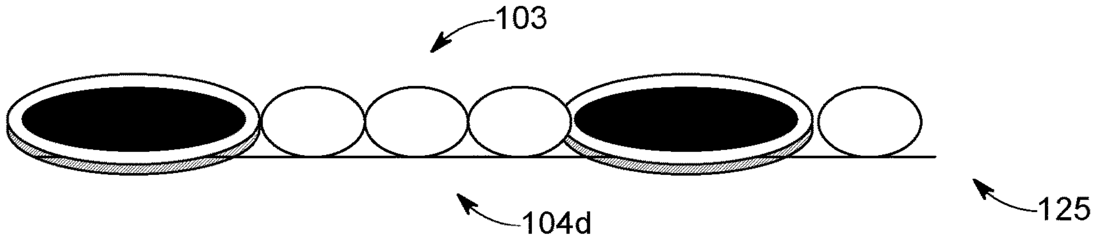

In the preferred embodiment shown in FIG. 2*d*, alternating patchwork arrangements of solvo-phobic and -philic regions 125 are placed and adsorbed atop surface 104*d*, e.g., peptides, and the surface physico-chemical "architecture" may be further optimised by those skilled in the art surface engineering—thereby advantageously maximising the extent of capture of the guest in the liquid 103 in nanoscale form from pure or multicomponent guest medium. The solvo-phobic and -philic regions may be tailored onto surfaces via a range of deposition methods, including, inter alia, plasma coating, chemical etching, solution-immersion processes and spray coating.

Figure 2E:
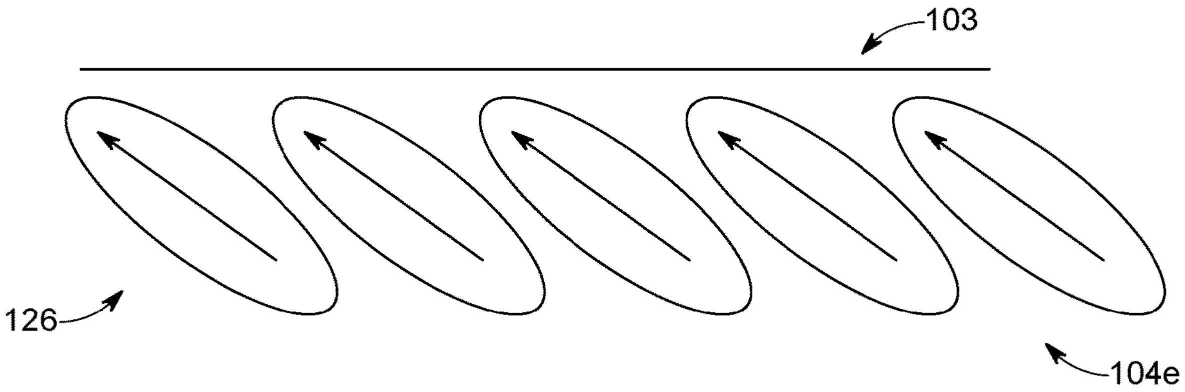

In the preferred embodiment shown in FIG. 2*e*, dipolar surface 104*e* features orientation and polarisation character with partly aligned dipoles 126. This polarisation effect facilitates further nanoscale capture of the medium by liquid 103, and those skilled in the art of polarisation materials and surface engineering may select optimal orientation-polarisation coatings for surfaces for targeted differential capture of particular species preferentially from a multicomponent guest medium. Polarised surfaces may be created by electrospinning with a polymer melt.

Importantly, an advantageous aspect of the present disclosure is that none of the surfaces in FIGS. 2*a* to 2*e* are in direct electrical contact with the liquid-medium mixtures, thus preventing energetically inefficient electrolysis, should there be any underlying electrical conduction. The universal feature of the "medium-drawing" properties of the surface characteristics outlined in FIGS. 2*a* to 2*e* lies in the manipulation in the local density and intermolecular-bonding arrangements in the liquid/solvent molecules, which facilitates (differential-species) absorption therein in nanoscale form.

Thus, the present disclosure differs completely in concept from known “fluid-to-nanoscale” absorption methods. In addition, the Coulombic character of the thus-formed nanoclusters allows for facile adsorption of solvated agents and impurities thereon for use as delivery agents (e.g., medicines, plant/fish/tree nutrients, plant epigenetic agents and gene-edited chemicals in high-technology agriculture) to, for instance, improve crop yields in lower-light conditions. Reactive versions of guest species' atomistic moieties may also be made by virtue of nanophase formation, which generally serves to improve the liquid's anti-bacterial and chemical-reactivity properties.

Figure 3:
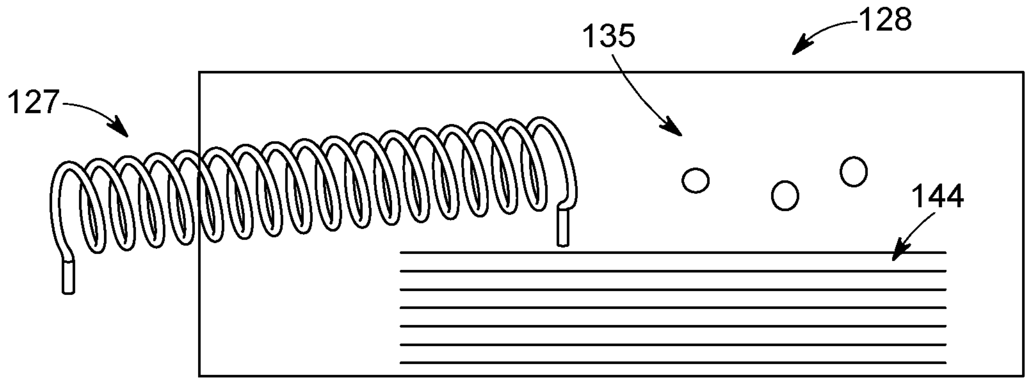
FIG. 3 is a schematic view of a preferred arrangement of the plurality of surfaces within a preferred generator according to the invention.

FIG. 3 depicts a general embodiment 128 of a series of surfaces 135, 144 in terms of their arrangement in generator 101 and the body of liquid 103 within volume 102. This may be operated under either batch, fed-batch or continuous-flow modes. A series of rods 144 composed of the surface materials of choice are shown in FIG. 3 to be horizontally mounted. However, this is not to be considered limiting and the rods may additionally or alternatively be diagonally or vertically-mounted. One or more magnets 127, together with rods 144 provides for a good deal of contact area to effect maximal inter-phase mass transfer from the guest medium to the “nano-dissolved” state. The distribution of random or semi-ordered inter-phase transfer packings 135 assists in this guest mass transfer. The combination of magnetic materials in terms of suitably shaped rods 144, packings 135 and optionally other inter-phase mass-transfer geometries (not shown) may be provided with dielectric coatings to produce polarisation and charge/solvent-interaction distributions promoting guest-liquid (inter-phase) mixing. Suitable dielectric coatings include for example ceramics or glass or one or more polymers selected from among polyethylene, polypropylene and polytetrafluoroethylene, all with a low dielectric constant, i.e., less than about 3-3.5 for the relative dielectric constant, that is less than that of silica, which is ca. 4.

FIGS. 4*a* to 4*d* depict an alternative efficient arrangement of surfaces, wherein the series of surfaces comprises a plurality of permanent magnets 123 and a plurality of surface-polarised and charged materials 124 arranged in a parallel, radial configuration and connected to a plurality of mesh elements 129. Each mesh element 129 may itself be coated and in character advantageously in some of the manners described above, e.g., in connection with FIGS. 2*a* to 2*e*.

Figure 4A:
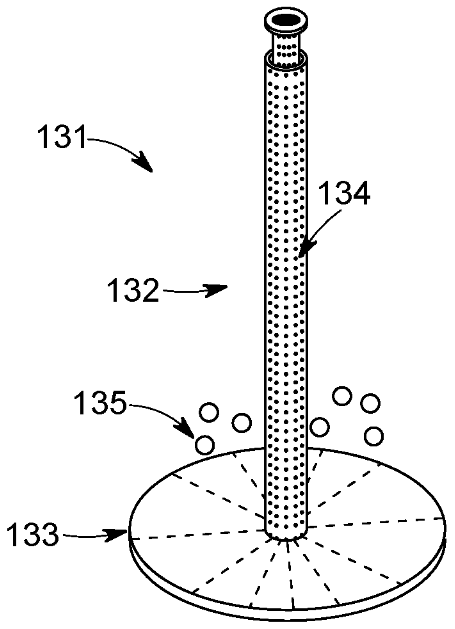
FIG. 4*a* a perspective view of a preferred delivery mechanism for promoting guest-liquid mixing contact.
Figure 4B:
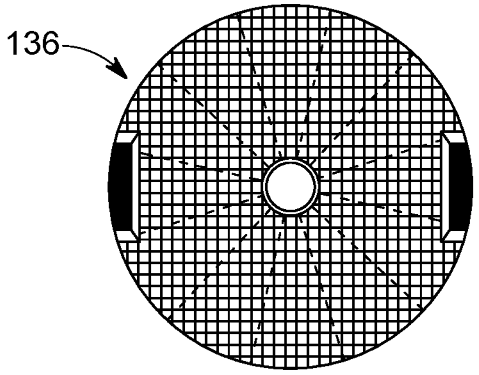
FIG. 4*b* is a plan view of a stacked assembly of meshes for use in combination with the delivery mechanism of FIG. 4*a;*
Figure 4C:
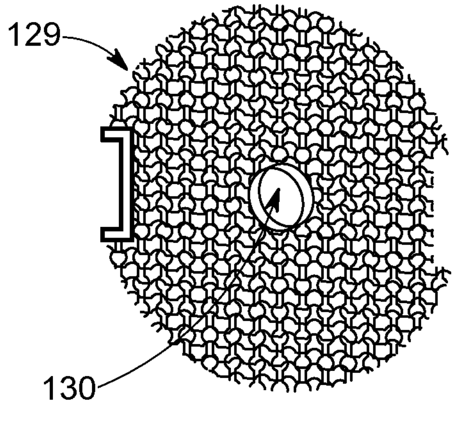
FIG. 4*c* is a perspective view of a preferred mesh of FIG. 4*b;*

FIG. 4*a* shows delivery mechanism 131 or facilitating the distribution of the fluid medium and/or liquid medium to and/or within volume 102. Delivery mechanism 131 comprises an elongated tubular member 132 and a plurality of outlet apertures 134. As shown in FIG. 4*c*, each mesh element 129 comprises an aperture 130 for receiving a portion of delivery mechanism 131.

Figure 4D:
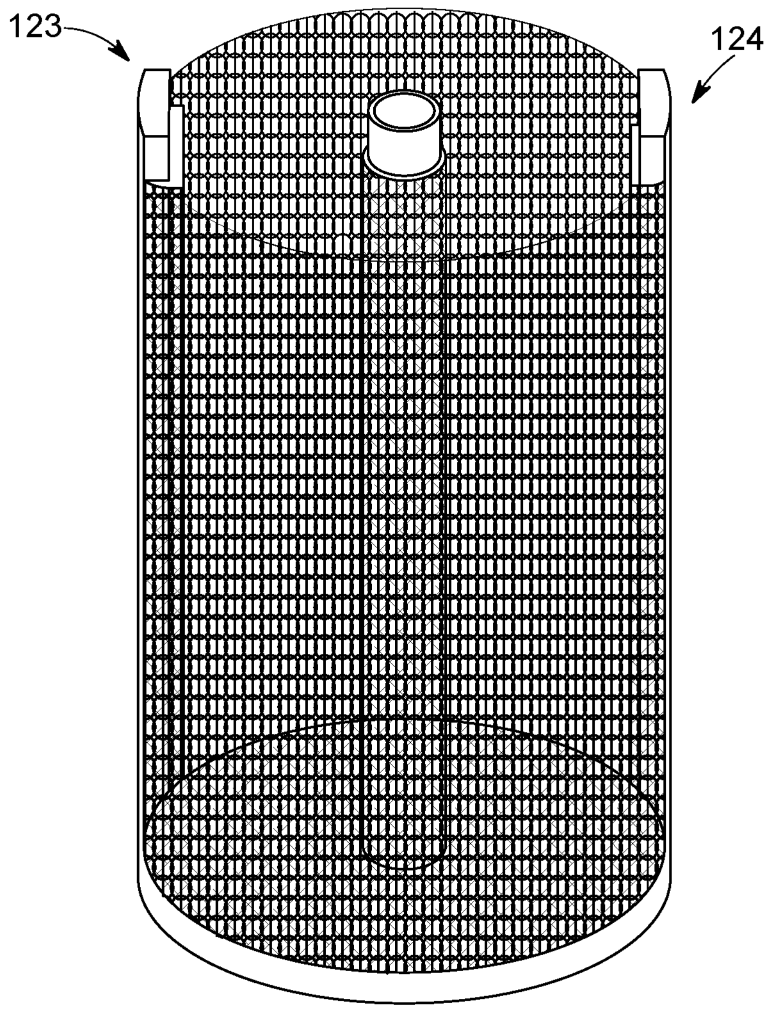
FIG. 4*d* is a perspective view of the preferred stacked assembly of meshes of FIG. 4*b* and the delivery mechanism of FIG. 4*a;*

As may be seen from FIG. 4*d*, elongated tubular member 132 of delivery mechanism 131 is dimensioned such that it extends through apertures 130 of mesh elements 129. In the exemplary embodiment shown in FIGS. 4*a* and 4*d*, elongated tubular member 132 is operably mounted on a base member 133. Base member 133 may also comprise outlet apertures 134. Elongated tubular member 132 and base member 133 may each independently be made of any of suitable insulating materials, for example polymers such as polyethylene, polypropylene, polyvinylchloride and polytetrafluoroethylene. The surface-coating strategies mentioned in connection with FIGS. 2*a* to 2*e* may also be used to coat either or both elongated tubular member 132 and base member 133.

Outlet apertures 134 are dimensioned such that the guest medium is accommodated but liquid 103 is prevented from entering the interior volume defined by either elongated tubular member 132 or base member 133. Advantageously, the interior of tubular member 132 may be filled with a strong, i.e., from 0.2 T to 10 T, permanent magnet (not shown) to impart additional nanocluster-creation impetus.

In the preferred embodiment shown in FIG. 4*a*, packings 135 are placed within the volume near delivery mechanism 131, e.g., adjacent elongate tubular member 132, to enhance yet further liquid-medium inter-phase mass transfer of guest species into the “nano-dissolved” cluster state.

Apertures 134 on base member 133 are preferably positioned with respect to mesh elements 129 such that the medium introduced to volume 102 from source 115 is not trapped near the bottom of volume 102 by the material wire of mesh elements 129. FIG. 4*b* depicts the arrangement of apertures 134 with respect to the mesh elements 129. In the preferred embodiment shown in FIGS. 4*a* and 4*b*, apertures 134 extend radially on base member 133 away from the tubular member 132. This embodiment of the series of surfaces 131, 129, 123, 124, with packings 135, increases both the levels of liquid/guest medium exposure to the spatial force distributions and influence of the surfaces about 15-fold compared with embodiments without such a mesh arrangement and structured-in-volume arrangement of packings, and, as such, the inventor argues that this embodiment is furthermore scalable for industrial applications.

Once the solvent and guest medium are well-mixed inside generator 101, as outlined in the description of FIGS. 3 and 4, relative to strategies for inter-phase mass transfer, nanocluster formation continues apace.

Example 1—Generation of Solvated Nanoclusters

Solvated nanoclusters were generated using a preferred method according to the invention as follows:

Prior to initiating the process, volume 102 was washed, cleaned and completely dried using a stream of air to avoid any contamination. Afterwards, volume 102 was examined for leakage by injecting nitrogen at a pressure of 1 MPa. The leakage test was to ensure the accuracy of pressure readings during nanocluster formation.

Various magnetic strengths were arranged as per FIGS. 4*a* and 4*d* inside volume 102, ranging from around 0.1 to 2 T for approximately uniform intensity distributions, in conjunction with ferritic Raschig rings coated with polytetrafluoroethylene.

100 $cm^3$ of deionised water 103 was loaded into volume 102 and the vessel inlet (not shown) subsequently sealed using a closure cap and a sealing gasket; this volume water 103 was found to afford good levels of reproducible performance.

Generator 101 was loaded with 100 bar gas from source 115 selected from oxygen, air, tetrahydrofuran and methane and the pressure was recorded during nanocluster formation, wherein the pressure associated with volume 102 was increased by injecting the selected gas from source 115 until the desired pressure was reached. In the exemplary experiment, up to about 3½ bar of gas was loaded into volume 102.

The density distributions and refinement of solvent intermolecular interactions in volume 102 facilitates the generation of nanoclusters using the magnetic strengths and ferritic Raschig rings, with their associated projected spatial force distributions as shown in FIGS. 2*a* to 2*e*. To prevent electrolysis occurring within the volume 102, neither surfaces (magnets and ferritic Raschig rings), nor water 103 are in direct electrical contact.

Water 103 was saturated after about 2 hours of gas-water contact in the presence of mechanical agitation to render the water turbulent for better water-gas contact, leading to higher nanocluster-formation yields. It will be appreciated that the values described herein are provided by way of example only and that alternative values may be used.

The temperature of volume 102 was controlled by circulating a mixture of water and ethylene glycol as coolant in isothermal bath 105. The temperature of isothermal bath 105 was adjustable in the range of 275-298 K. A platinum resistance thermometer (Pt-100) 113 with an accuracy of 0.1 K was calibrated against a reference platinum resistance thermometer and used to measure the temperature of volume 102. The pressure associated with volume 102 was monitored by a transducer 114 with an uncertainty of ±0.010 MPa.

Table 1 below shows the data for a range of pressures from atmospheric pressure up to about 3½ bar gas obtained from data-acquisition program 112 which recorded temperature and pressure at different time intervals. This table illustrates that the levels of metastable guest accommodation in nanocluster form achievable from the method of Example 1 are significantly higher than those known heretofore.

TABLE 1

Stored $CH_4$ and $O_2$ levels in nanoscale hydrate crystallites or domains in water

| Fluid | Pressure (bar g) | Form | Temperature (° C.) | Guest accommodation w.r.t. Henry's Law |
|---|---|---|---|---|
| Oxygen | 3.1 | Fluid Domain | 20 | 2.36 |
| Air | 0 | Fluid Domain | 20 | 2.18 (O2); 1.52 (N2) |
| THF | 1.4 | Hydrate Crystallite | 3.7 | 15.6 |
| Methane | 3.2 | Fluid Domain | 20 | 25.8 |

Using pure water as an example, for methane, it is found that levels of gas solubility are 25 times higher than the Henry's-Law level for methane (as fluid nanodomains) and about 15-fold at lower temperatures in the form of hydrate nanocrystallite for THF. In the case of oxygen, levels for its gas solubility are over twice as great with the method of the present disclosure, using both pure $O_2$ and air at high- and ambient-pressures.

Figure 5:
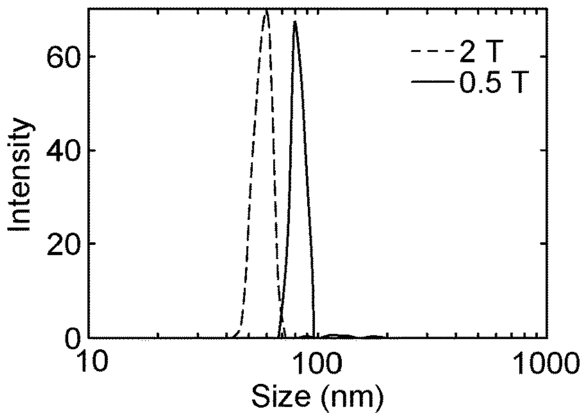
FIG. 5 is a graph generated following light scattering experiments and illustrates typical distribution of the Sauter mean diameter of nanoclusters produced by the method according to the invention at various magnetic intensities.

Light-scattering experiments were performed to ascertain the size distribution of the solvated hydrated nanoclusters and a typical example is shown in FIG. 5 as a function of the magnetic strength, with a greater population of smaller nanoclusters formed under stronger magnetic action. This allows for the possibility of using magnetic intensity as a control agent for the regulating the formation of nanoclusters—particularly their relative size and population.

Figure 6:
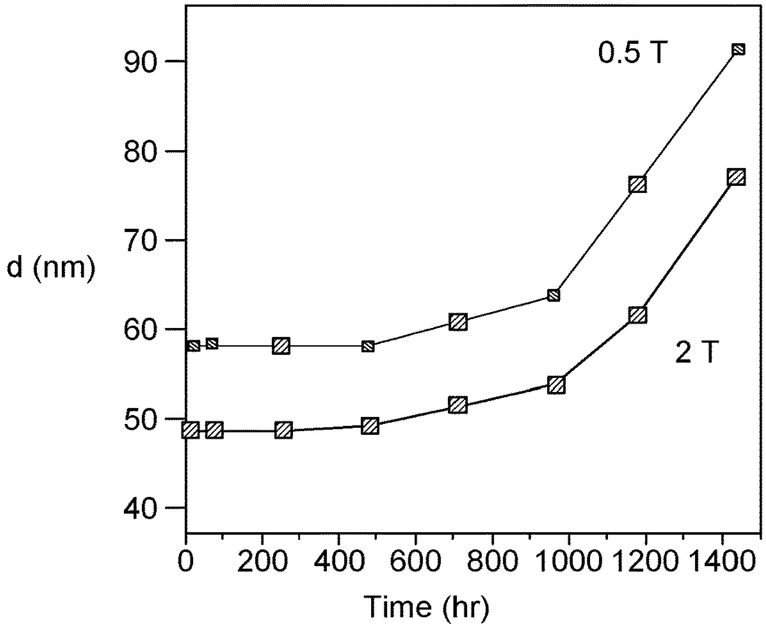
FIG. 6 is a graph illustrating the relationship between nanocluster Sauter mean diameter and time, and the enhancement to the nanocluster stability, at various magnetic strengths.
Figure 7:
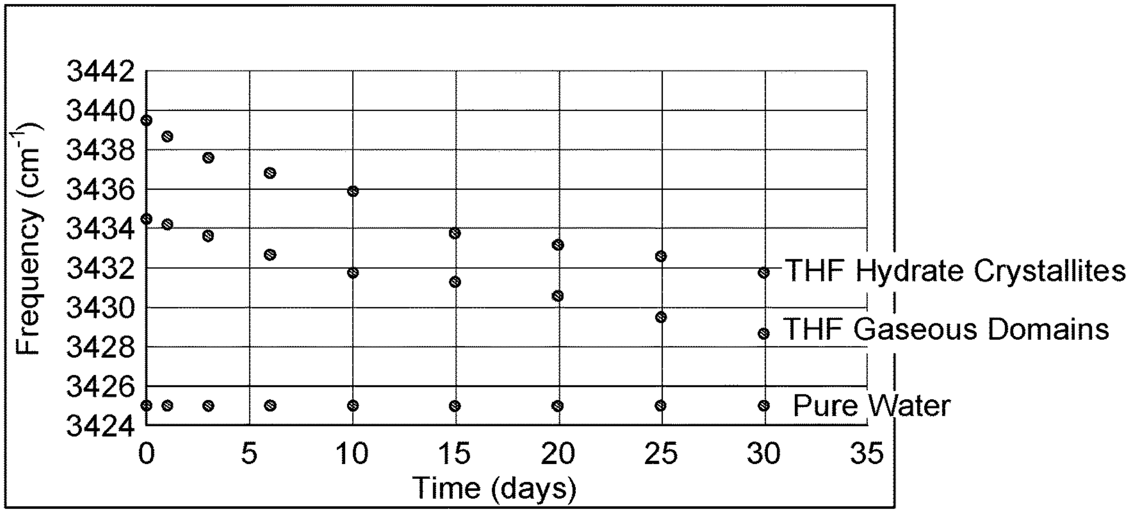
FIG. 7 is a graph illustrating the extent of structuring of water in the proximity of nanoclusters.

After the formation of hydrate nanoclusters, the water solution was stored under ambient condition (pressure, temperature) and the stability of the nanoclusters studied. The results show higher stability versus gradual agglomeration of the clusters under stronger magnetic-formation conditions, as illustrated in FIG. 6. In addition, the evolution of the O—H blue shift in water molecules, indicating their more structured nature, was found to decline somewhat over time in the case of $CO_2$ hydrate quasi-crystallite fluid-phase domains, as these domains and nanostructured water began to return slowly to the reference state of pure water, with slow, gradual release of the nanophase.

Figure 8A:
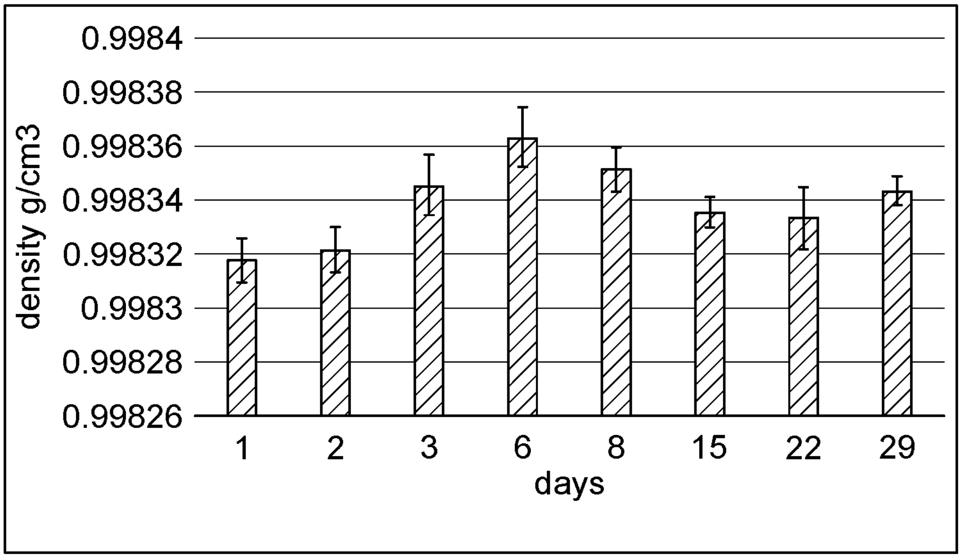
FIG. 8*a* is a graph illustrating the density of water containing nanoclusters of air over time at 25° C. and atmospheric pressure (STP), with upwards shift compared to pure, deionised water (0.99824 g/cm$^3$) evident.
Figure 8B:
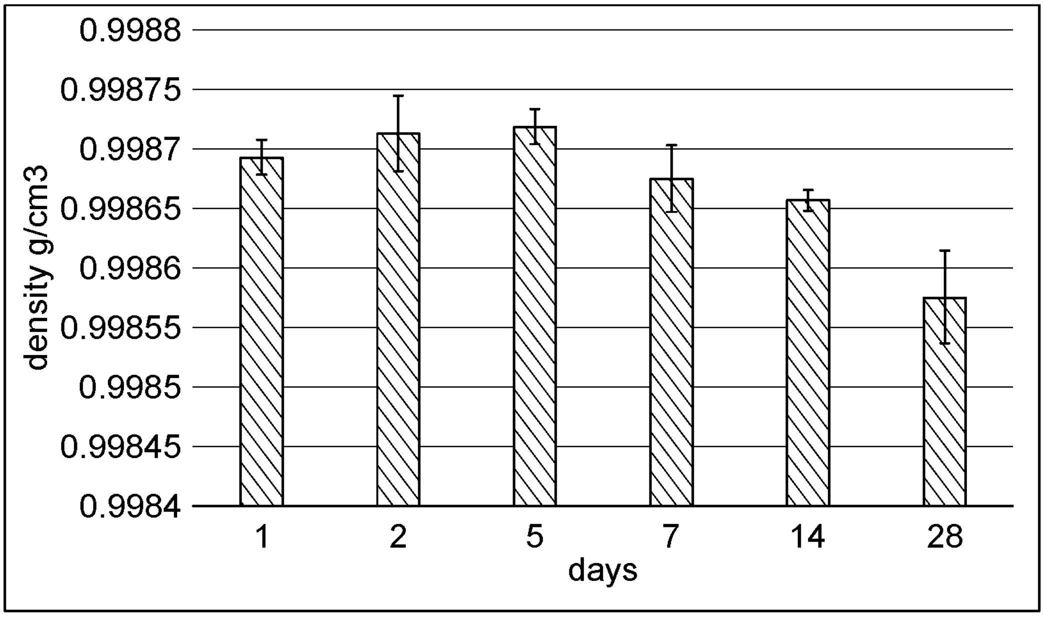
FIG. 8*b* is a graph illustrating the density of water containing nanoclusters of $CO_2$ over time at 25° C. and atmospheric pressure (STP), with upwards shift compared to pure, deionised water (0.99824 g/cm$^3$) evident.

In a similar way, the density of the water was studied over time for both air and $CO_2$ fluid-state nanoclusters, and FIGS. 8*a* and 8*b* show both exhibiting a density enhancement of water containing nanoclusters of air (FIG. 8*a*)/$CO_2$ (FIG. 8*b*) relative to pure water—which shows the nanostructuring of the water. Again, there is a dissipation over time back towards the reference state with no nanoclusters, but this is very slow—indicating the strong metastability of the nanophase over weeks to months.

The method of the present disclosure addresses species-selective capture from multicomponent guest fluids (either single- or multiple-phase) into nanoscale form. One possible realisation of this, although it should not be understood to be the limit of its scope, is a mixture of methane and carbon dioxide. The carbon dioxide Henry's-Law coefficient solubility in milligrams per litre is 30 times greater than methane's Henry's law coefficient solubility. The application of the method of Example 1 above to such a mixture leads to an 11-fold increase in carbon dioxide accommodation in water compared to the Henry's Law solubility level, and thus a significantly greater portion of carbon dioxide than methane is diffused into water, purifying the residual fluid-phase methane to a level in the range of from 97 to 97.5%. This has significant applications for example in the bio- and flue-gas industry for controlling methane production in agriculture and low energy carbon capture, respectively, or for treating bio-gas from anaerobic digestors (e.g., in the waste-water treatment industry).

A further exemplary realisation relates to air—approximated as a mixture between oxygen (20%) and nitrogen (80%), where the oxygen is enriched selectively in water in fluid nanodomain form with a composition therein of about two-thirds, at the relative expense of nitrogen, with a fluid nanodomain composition of around third. These results were obtained using sodium bisulphite to draw out the number of moles of true oxygen from the nanocluster state, beyond Henry's Law limit.

The species-selective uptake from a multicomponent fluid phase guest medium, i.e., the additional level of guest accommodation in the nanocluster state beyond regular thermodynamic solubility limits for guests, may be described by a modified form of a non-equilibrium form of Henry's Law $y_i^* = K_i^* x_i^*$, where * refers to nanoscale guest accommodation (in solvated nanocluster form, whether as a entropy- or kinetically-limited quasi solvate-crystallite or in a fluid-phase domain) for component i, $K_i^*$ is the new, enhanced nano-dissolution parameter (in excess of Henry's Law), and y and x refer to fluid- and nano-phase mole fractions, respectively. Strictly, $K_i^*$ is time-dependent, but, in practice, varies much more slowly compared to the residence times of many industrial processes, e.g., over weeks/months.

Plant growth is enhanced substantially using air nanoclusters in irrigation water formed in by the method described in Example 1 above, with the differential preferential uptake of oxygen into this nanoscale form (about two thirds), at the expense of nitrogen (about one third), with enhanced $CO_2$ uptake too from air (enhanced to of the order of 1,500 ppm (air-equilibrium equivalent) from about 415 ppm in atmospheric air). Less nutrients and fertilisers are thus needed, as these adsorb efficiently to the nanoscale gaseous domains' surfaces, meaning that a substantial fraction (typically up to half, and sometimes a greater fraction) less fertiliser needs to be added. Results with potato, watercress, lettuce and basil found that up to 40% extra growth occurred in soil with half the customary level of fertiliser, with light-scattering cluster populations of the order of $10^7$ per ml. It was similar (~30-40% growth enhancement) with enhanced levels of $CO_2$ nanocluster in water-spray aerosol fog. Reducing the light level by up to three-quarters had substantially less impact on nanocluster-enhanced growth approaches than by the same light-level reduction when simply using conventional water.

The recorded level of $CO_2$ enhancement in the nanoclusters is important in the capture of this gas and other pollutants from both flue-gas and air. It was also observed that the method described in Example 1 above using a solvent fuel instead of water greatly enhanced the level of air and water in petroleum-based fuels as nanoclusters, and this can be applied readily towards other gases.

Figure 9:
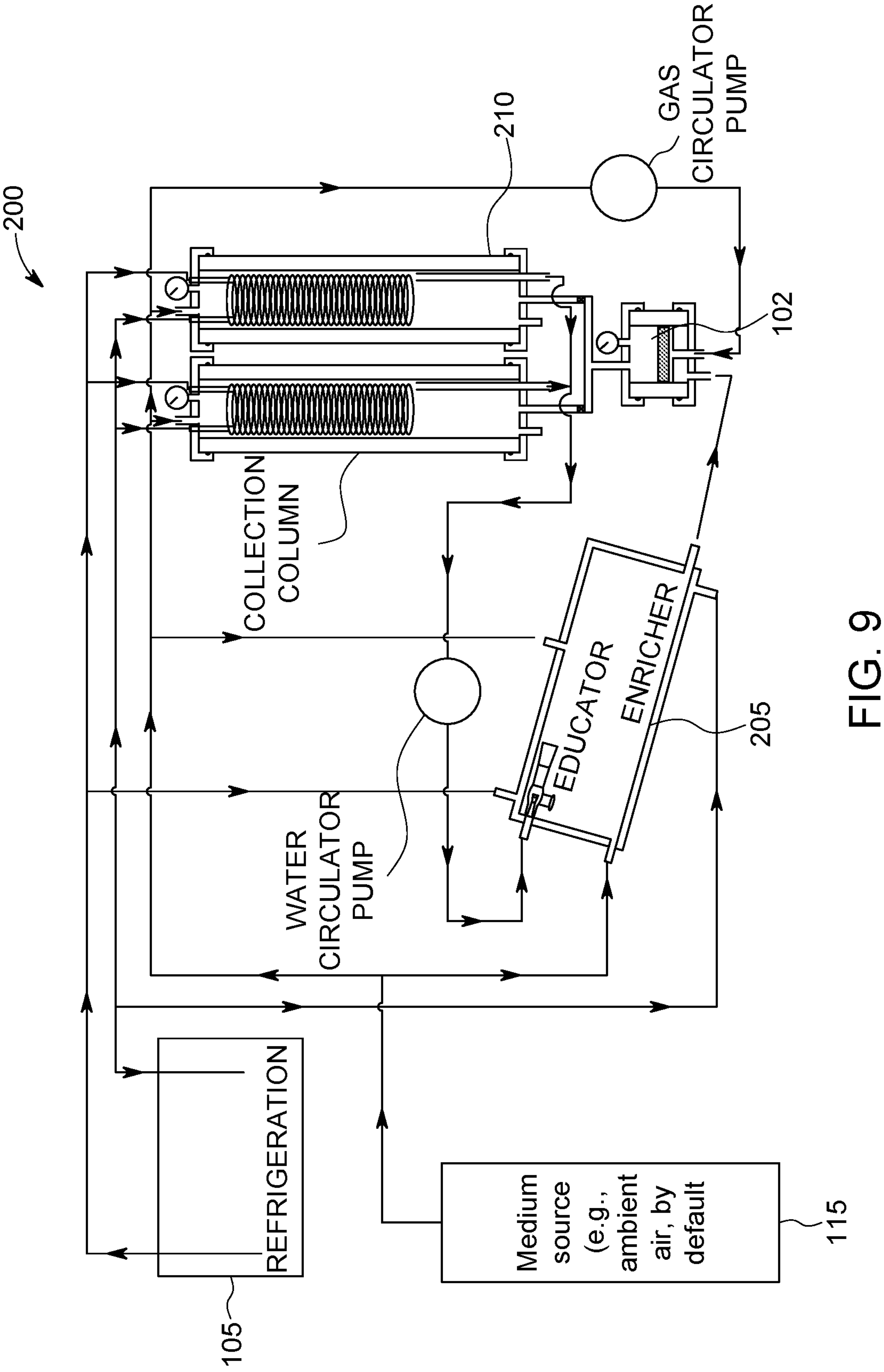
FIG. 9 is a process diagram detailing an alternative preferred system for use in performing the method according to the invention of producing solvated nanoclusters.

Referring to FIG. 9, there is illustrated another system 200 for generating nanoclusters, which is also in accordance with the present general teaching. System 200 is substantially similar to system 100 and like elements are indicated by similar reference numerals. The main difference between system 200 and system 100 is that system 200 includes a gas sparger 205 for enriching the fluid medium, i.e., for producing meso-scale droplets or bubbles prior to nanocluster formation, given that boosting the level of fluid mixing with the liquid is highly beneficial in increasing the efficiency of nanocluster generation.

A storage vessel 210 may be used for storing the nanoclusters. In system 200, storage vessel 210 is at 3-4° C. which slows very substantially nanocluster reverse cavitation and agglomeration to micro-size (and escape to gas phase). However, for longer-term storage (in terms of months), or for transport of the liquid containing nanoclusters, water containing nanoclusters may be (quench-) frozen straight after taking it out of volume 102. It is then thawed out for use later.

Notably, freezing the liquid containing nanoclusters at high pressure whilst it is still in volume 102 will allow for time-preservation of much higher levels of de-facto guest accommodation in nanoclusters. For example, it is possible to achieve elevated levels (thousands of mg/l) of $O_2$ in ice, which may then be stored at ambient pressure in a freezer for periods of days and weeks; the gas will seep out of the ice, but slowly. The frozen nanoclusters may be stored in a cheap, commodity ~25 bar pressure-vessel bucket, e.g., made of plastic or aluminium, such as is commonly/routinely available in the process industries for intermediate pressurised storage during transport, and it could be kept in this vessel in a normal industrial/consumer freezer in a very economic manner for longer-term storage and transport with significantly elevated gas levels, and then used elsewhere when thawed, e.g., to gasify or aerate water bodies quickly.

By exposing the storage volume 210 to a ~10-100 kHz, 10-50 N acoustic-sonic impulse, the nanoclusters containing quasi-solvate-crystallites or hydrated/solvated nano-scale gas or liquid guest molecules/moieties are seen to essentially leave the liquid within hours, rather than the many weeks, or some months, of metastability that occurs otherwise. This is due to resonant sonication frequencies with capillary waves at the nano-domain/solvent interface increasing inter-phase "leakage" from the nano- to the traditionally-dissolved state. Similar guest-release phenomena were observed with selected surfactant agents.

Figure 11:
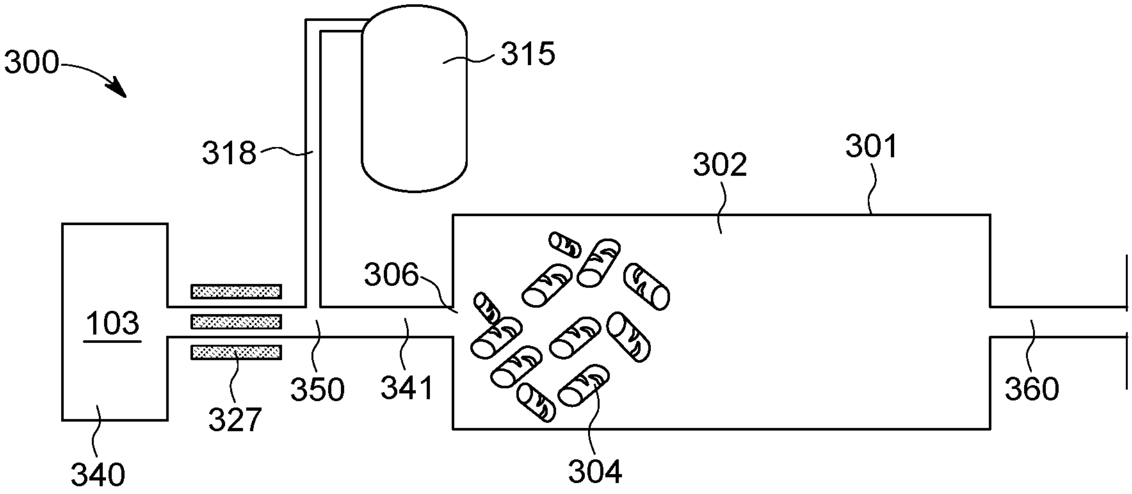
FIG. 11 is a schematic view of another alternative preferred generator according to the invention.

An alternative preferred system according to the invention for generating nanoclusters and generally referred to herein by reference numeral 300 is shown in FIG. 11. System 300 comprises generator 301 provided with pipe-column 302. In the preferred embodiment shown in FIG. 11, pipe-column 302 is made of PVC and is approximately 1 m in length and 5.5 cm in inner diameter. Non-magnetic, austenitic stainless-steel (316L-grade) 16 mm Pall rings 304 are packed in column 302 at a density of 135 per litre.

Liquid 103 may be introduced into inlet 306 of pipe-column 302 via inlet conduit 341. A fluid guest medium may be supplied to pipe-column 302 from source 315 via a Mazzei Venturi air injector (0.75", '0584' model) 350 located upstream of inlet 306. A plurality of Neodynium-52 bar magnets 327 are placed radially around the conduit upstream of Venturi 350.

In use of system 300, the fluid guest medium and liquid 103 are exposed to Pall rings 304. The method may be performed by generating the nanoclusters in batch mode or under flow conditions, i.e., wherein liquid 103 and the medium distributed therein flow through pipe-column 302 and out of outlet 360 rather than being contained in pipe-column 302. In both embodiments, spatial force distributions in liquid 103 resulting from magnets 327 and Pall rings 304 facilitate the generation of solvated nanoclusters in excess of conventional guest-species solvation.

Liquid containing the nanoclusters may be removed from pipe-column 302 via outlet 360.

Example 2a

Hydrated air/propane nanoclusters were generated using a preferred method according to the invention as follows:

Prior to initiating the process, pipe-column 302 was washed, cleaned and completely dried using a stream of air to avoid any contamination. Afterwards, pipe-column 302 was examined for leakage by injecting nitrogen at a pressure of 1 MPa. The leakage test was to ensure the accuracy of pressure readings during nanocluster formation.

430-grade stainless-steel 16 mm magnetic Pall rings 304 were packed in column 302 at a density of 135 per litre. The Pall rings had ferritic and magnetic susceptibility about 10% less than plain carbon steel.

For the generation of nanoclusters of air, water 103 from source 340 was introduced into and flowed through pipe-column 302 at a flowrate of 30-40 l/min, allowing full pull of Venturi 350 at around 3.5-5 l/min of ambient air, i.e., at standard temperature and pressure.

The temperature of the air-uptake experiments (into solvated air nanoclusters) varied from 8° ° C. to 14° C.

For the generation of nanoclusters of propane, propane cylinder 315 with a discharge regulator set at 5.5 bar g was added as a further guest medium source.

The temperature of propane-uptake experiment was 4° C., and circa 70 litres of this water containing solvated propane-rich nanoclusters was passed into a 100-litre tank, which was then sealed and pressurised initially at 5 bar g by propane cylinder, and then maintained at 4° C. under constant-volume (isochoric) conditions.

Example 2b

Hydrated air/propane nanoclusters were generated as for Example 2a but using 316- and 430-grade stainless-steel 16 mm magnetic Pall rings 304 wherein the Pall rings were spray-coated with polytetrafluoroethylene (PTFE) using electrostatic spray deposition to a thickness of circa 100 microns so as to have the internal spatial Coulombic distributions emanating therefrom into the mother liquor and guest medium—alongside magnetic spatial distributions of force.

Experiments were also conducted with non-magnetic coated and uncoated Pall rings, leading to a 2×2 factorial design of various packed-bed two-phase-flow configurations.

Results

In the case of atmospheric air uptake, with a view towards forming solvated oxygen-rich nanoclusters, it was desired to assess of the 2×2 cases of coated and uncoated Pall rings (magnetic and non-magnetic) as to what the level of nanocluster generation would be. The population of nanoclusters was seen to be largest in the case of the coated and magnetic Pall rings as per Example 2b above—see Table 2 below for mass of oxygen in nanocluster form (beyond conventionally dissolved oxygen) from standard oxygen-titration analysis:

TABLE 2

Nanocluster population for different packing types

| Pall ring packing type | Nanocluster oxygen mass (mg/l) |
|---|---|
| Non-magnetic, uncoated | 1.9 |
| Non-magnetic, coated | 5.7 |
| Magnetic, uncoated | 3.2 |
| Magnetic, coated | 9.4 ± 0.7 |

Using a statistical-effects model for the factorial design, it can be seen that both variables are statistically important, with the coating effect being particularly important, although the magnetic influence is important—with an important magnetic-coating interaction as well.

Example 3

Having established the superiority of magnetic and coated Pall rings, system 300 was used for clathrate-hydrate nanocluster experiments. In terms of propane-hydrate nanoclusters, the use of reaction-titration analysis immediately after leaving the nanocluster generator quantified the level of propane dissolved as individual molecules (Henry's Law) and in nanoclustered form as a fluid (but not yet as a hydrate)—about 95% and 3.5 times the Henry's-Law level at 5 bar g, respectively. Then, in the downstream tank after 3 hours of constant-volume conditions, the pressure had stabilised and propane-hydrate nanoclusters had formed. In this case, with the pressure having settled and additional propane absorbed from the gas-headspace phase, the conversion of fluid-phase propane nanoclusters into propane-hydrate nanoclusters (i.e., in crystallite form) took place, and the mass of propane in molecular (Henry), solvated fluid nanocluster and hydrate-crystallites was then about 97%, 1.35 times and 14.3 times Henry's-Law level at 5 bar g, respectively. The occupation of the crystallite hydrate nanoclusters was about 90% of the maximum theoretical level.

Figure 10:
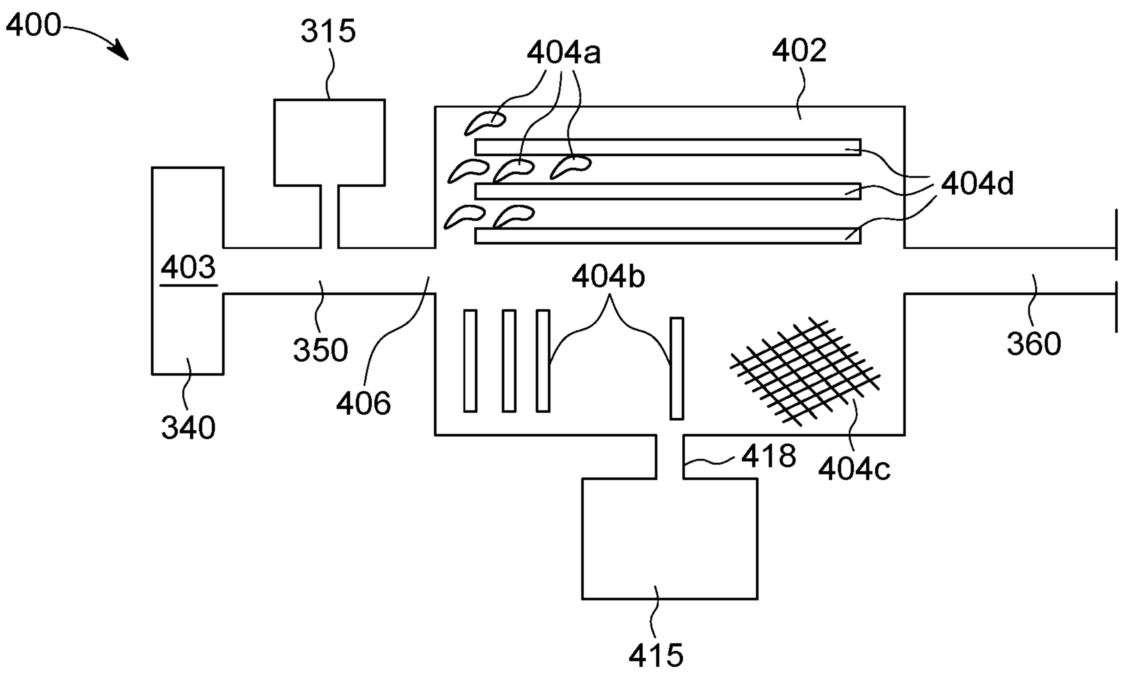
FIG. 10 is a schematic view of an alternative preferred generator according to the invention.

An alternative preferred system according to the invention for generating nanoclusters and generally referred to herein by reference numeral 400 is shown in FIG. 10. System 400 is substantially similar to system 300 and like elements are indicated by similar reference numerals. The main difference between system 400 and system 300 is that system 400 comprises vessel 402 packed with random packings 404*a* and structured packings in the form of vertically mounted rods 404*b*, meshes 404*c* and horizontally mounted rods 404*d*. All surfaces 404*a*, 404*b*, 404*c* and 404*d* possess one or more of magnetic, charged, dielectric, polarised, solvophobic, solvophilic and dipolar character such that in use of system 400 the surfaces emit one or more spatial force distributions with a strength in the pico Newton to nano Newton range (~5 pN to 10 nN) on atoms in the solvent and guest molecules to create local density undulations and oscillations in the solvent located in volume 402.

Surfaces 404*b*, 404*c* and 404*d* may each independently optionally be connected to an electric source. An extra fluid guest medium source 415 and conduit 418 may be provided alternatively, or in addition to, fluid guest medium source 315 and conduit 318.

Venturi 350 may be replaced aby an alternative mixer/enricher for micro-, meso-, macroscale droplets and bubbles, i.e., jet-screw, atomiser or the like.

Aspects of the present invention have been described by way of example only and it should be appreciated that additions and/or modifications may be made thereto without departing from the scope thereof as defined in the appended claims.

The invention claimed is:

1. A method of producing solvated nanoclusters, the method comprising the following steps:

providing a container with a plurality of surfaces distributed therein;

introducing a solvent within which the solvated nanoclusters are to be generated into the container such that the solvent comes in contact with the plurality of surfaces;

providing a guest substance in fluid form; and distributing the guest substance within the solvent, wherein the plurality of surfaces comprises random packings or structured packings or both, and wherein the packings are made of or coated with either (i) permanent-magnetic material or (ii) dielectric or charged/polarised material that has a quasi-permanent electric charge or dipole polarisation.

2. The method of claim 1, wherein the plurality of surfaces comprise packings made of or coated with permanent-magnetic material to provide a magnetic strength of from about 0.1 T to about 0.5 T.

3. The method of claim 1, wherein the plurality of surfaces comprise packings made of or coated with dielectric or charged/polarised material that has a quasi-permanent electric charge or dipole polarisation to provide a Coulombic field strength in the range of from about $10^5$ V/m to about $10^7$ V/m.

4. The method of claim 1, wherein the packings are coated with solvophobic and/or solvophilic material to provide regions with solvophobic and/or solvophilic character, respectively.

5. The method of claim 1, wherein the plurality of surfaces comprises packings made of permanent-magnetic material and coated with dielectric or charged/polarised material that has a quasi-permanent electric charge or dipole polarisation.

6. The method of claim 1, wherein the plurality of packings comprises packings with a size in the order of from about 15 mm to about 150 mm.

7. The method of claim 1, wherein the method comprises providing and distributing more than one guest substance in fluid form.

8. The method of claim 7, wherein the guest substances to be distributed within the solvent comprise a plurality of liquids.

9. The method of claim 1, wherein least one guest substance comprises a gas.

10. The method of claim 1, wherein at least one guest substance comprises a liquid.

11. The method of claim 1, wherein the plurality of surfaces comprises surfaces coated with an electrically insulating coating.

12. The method of claim 1, wherein the plurality of surfaces comprises structured packings arranged in a parallel configuration.

13. The method of claim 1; wherein the method further comprises the step of cooling the contents of the container.

14. The method of claim 1, wherein the method further comprises agitating the contents of the container.

15. The method of claim 1, wherein the method further comprises the step of releasing the nanoclusters from the solvent by applying an acoustic-sonication or electromagnetic signal to the container or by adding a chemical agent such as a surfactant to the solvent containing the nanoclusters.

16. A generator for producing nanoclusters using the method of claim 1, the generator comprising:

the container containing the plurality of surfaces distributed therein, a solvent inlet for introducing solvent into which the solvated nanoclusters are to be generated into the container such that the solvent comes in contact with the surfaces; and a fluid guest medium inlet for introducing a guest substance in fluid form into the container for distribution within the solvent, wherein the plurality of surfaces comprises random packings or structured packings or both, wherein the packings are made of or coated with either (i) permanent-magnetic material or (ii) dielectric material that has a quasi-permanent electric charge or dipole polarisation to emit spatial force distributions which result in the manipulation of the local density and intermolecular bonding arrangements in the solvent molecules to facilitate absorption of the fluid guest medium in the nanoscale by enhancing the de-stabilisation of macroscopic droplets, clusters and bubbles.

17. The generator as claimed in claim 16 further comprising a fluid-solvent turbulence generator.

18. The generator as claimed in claim 16 further comprising an internal electric source located within the container.

19. A system for generating solvated nanoscale features in a liquid, wherein the nanoscale features are gas, liquid or crystallite form and present in amounts beyond thermodynamic solubility, the system comprising a generator as claimed in claim 16 and one or more sensors, wherein the sensors are selected from among a temperature sensor for sensing temperature associated with the contents of the container, a pressure sensor for sensing pressure associated with the generator and one or more pH sensors.

20. The system as claimed in claim 19 further comprising a data-acquisition system for recording the parameters monitored with said sensors at predetermined intervals.

21. The system as claimed in claim 19 further comprising a storage vessel for storing the generated nanoclusters.

22. The system as claimed in claim 19 further comprising a control circuit in communication with the generator and one or more of a gas source for supplying a gas medium, a liquid source for supplying a liquid medium, a vacuum pump and a cooling means for cooling the contents of the container.

23. A method for improving plant growth comprising watering a plant using water containing air and $CO_2$ nanoclusters generated using the method of claim 1, wherein the solvent is water and the fluid guest medium comprises air and carbon dioxide.

24. A method for capture of $CO_2$ and pollutants from flue-gases and air in solvents, the method comprising generating nanoclusters using the method of claim 1, wherein the plurality of surfaces comprise packings made of permanent magnetic material coated with dielectric material that has a quasi-permanent electric charge or dipole polarisation and further coated with a solvophobic coating.

25. A method for capture of gas and water in petroleum, diesel and oil-bio-based fuels, the method comprising generating nanoclusters using the method of claim 1, wherein the solvent is selected from among petroleum, diesel and oil-bio-based fuels and the plurality of surfaces comprise packings made of permanent magnetic material coated with dielectric material that has a quasi-permanent electric charge or dipole polarisation and further coated with solvophilic and hydrophilic coatings.

* * * * *